United States Patent
Yamazaki et al.

(10) Patent No.: US 10,795,121 B2
(45) Date of Patent: *Oct. 6, 2020

(54) IMAGING LENS AND IMAGING DEVICE

(71) Applicant: MAXELL, LTD., Otokuni-gun, Kyoto (JP)

(72) Inventors: Masaki Yamazaki, Osaka (JP); Takashi Sugiyama, Osaka (JP)

(73) Assignee: MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,675

(22) Filed: Nov. 6, 2018

(65) Prior Publication Data

US 2019/0072746 A1 Mar. 7, 2019

Related U.S. Application Data

(63) Continuation of application No. 15/337,492, filed on Oct. 28, 2016, now Pat. No. 10,168,508, which is a (Continued)

(30) Foreign Application Priority Data

Mar. 29, 2012 (JP) .................... 2012-076319

(51) Int. Cl.
*G02B 9/34* (2006.01)
*G02B 13/00* (2006.01)
(Continued)

(52) U.S. Cl.
CPC ........... *G02B 13/004* (2013.01); *G02B 5/005* (2013.01); *G02B 5/208* (2013.01); *G02B 9/34* (2013.01);
(Continued)

(58) Field of Classification Search
None
See application file for complete search history.

(56) References Cited

U.S. PATENT DOCUMENTS 5,253,111 A   10/1993  Chiba et al.
5,861,999 A *  1/1999  Tada ................ G02B 13/06
                                                      359/713

(Continued)

FOREIGN PATENT DOCUMENTS

CN    102289052 A    12/2011
CN    102289053 A    12/2011
(Continued)

OTHER PUBLICATIONS

May 21, 2013 International Search Report issued in International Patent Application No. PCT/JP2013/001036.
(Continued)

*Primary Examiner* — Darryl J Collins
(74) *Attorney, Agent, or Firm* — Oliff PLC

(57) ABSTRACT

An imaging lens is provided with: a first lens with negative power; a second lens with negative power; a third lens with positive power; and a fourth lens with positive power. The cemented fourth lens is formed from an object side lens with negative power and an image side lens with positive power. The thickness of a resin adhesive layer that bonds the object side lens and the image side lens is 20 μm or greater on the optical axis, and when Sg1H is the amount of sag in the image side lens surface of the object side lens and Sg2H is the amount of sag in the object side lens surface of the image side lens. The bonding operation is easy without damage occurring to the cemented surfaces, with a design that takes into account thickness of the resin adhesive layer; therefore various forms of aberration can be corrected.

3 Claims, 31 Drawing Sheets

Related U.S. Application Data continuation of application No. 15/139,646, filed on Apr. 27, 2016, now Pat. No. 9,632,292, which is a continuation of application No. 14/375,968, filed as application No. PCT/JP2013/001036 on Feb. 22, 2013, now Pat. No. 9,360,656.

(51) Int. Cl.
| | | |
|---|---|---|
| *G02B 13/04* | (2006.01) | |
| *G02B 13/18* | (2006.01) | |
| *G02B 5/20* | (2006.01) | |
| *H04N 5/33* | (2006.01) | |
| *G02B 13/14* | (2006.01) | |
| *G02B 27/00* | (2006.01) | |
| *G02B 5/00* | (2006.01) | |

(52) U.S. Cl.
CPC .......... *G02B 13/006* (2013.01); *G02B 13/04* (2013.01); *G02B 13/146* (2013.01); *G02B 13/18* (2013.01); *G02B 27/0025* (2013.01); *H04N 5/33* (2013.01)

(56) References Cited

U.S. PATENT DOCUMENTS

| | | | |
|---|---|---|---|
| 7,298,561 | B1 | 11/2007 | Yamashita et al. |
| 8,134,787 | B2 | 3/2012 | Saitoh |
| 9,360,656 | B2 | 6/2016 | Yamazaki et al. |
| 9,632,292 | B2 | 4/2017 | Yamazaki et al. |
| 2005/0275955 | A1 | 12/2005 | Sekine |
| 2006/0087747 | A1* | 4/2006 | Ohzawa .................. G02B 13/04 359/749 |
| 2010/0188757 | A1 | 7/2010 | Saitoh |
| 2010/0254025 | A1 | 10/2010 | Yoshida et al. |
| 2010/0321801 | A1 | 12/2010 | Tokunaga et al. |
| 2012/0069140 | A1 | 3/2012 | Tsai et al. |
| 2014/0340767 | A1 | 11/2014 | Mori et al. |

FOREIGN PATENT DOCUMENTS

| | | |
|---|---|---|
| CN | 202230237 U | 5/2012 |
| JP | H04-171401 A | 6/1992 |
| JP | 2006-284620 A | 10/2006 |
| JP | 2009-063877 A | 3/2009 |
| JP | 2010-164718 A | 7/2010 |
| JP | 2010-243711 A | 10/2010 |
| JP | 2010-271450 A | 12/2010 |
| JP | 2011-027862 A | 2/2011 |
| JP | 2011-028239 A | 2/2011 |

OTHER PUBLICATIONS

Sep. 29, 2014 English Translation of the Written Opinion of the International Search Authority cited in International Patent Application No. PCT/JP2013/001036.
Jul. 6, 2017 Office Action issued in U.S. Appl. No. 15/459,702.
Oct. 30, 2017 Office Action issued in U.S. Appl. No. 15/459,702.
Feb. 16, 2018 Office Action issued in U.S. Appl. No. 15/337,492.

* cited by examiner

IMAGING LENS AND IMAGING DEVICE

This application is a Continuation of application Ser. No. 15/337,492 filed on Oct. 28, 2016, which in turn is a Continuation of application Ser. No. 15/139,646 filed Apr. 27, 2016, now U.S. Pat. No. 9,632,292, which in turn is a Continuation of application Ser. No. 14/375,968 filed Jul. 31, 2014, now U.S. Pat. No. 9,360,656, which in turn is a National Phase of International Patent Application No. PCT/JP2013/001036 filed Feb. 22, 2013, which claims the benefit of Japanese Patent Application No. 2012-076319 filed Mar. 29, 2012. The disclosure of the prior applications is hereby incorporated by reference herein in their entireties.

TECHNICAL FIELD

The present invention relates to: an imaging lens provided with, in order from an object side, a first lens, a second lens, a third lens, and a fourth lens, the fourth lens being a cemented lens; and an imaging device equipped with the imaging lens.

BACKGROUND ART

There are known imaging lenses equipped with a cemented lens in order to correct various forms of aberration, such as chromatic aberration, with a small number of lenses. The imaging lens disclosed in Patent Document 1 is configured from, in order from an object side to an image side: a first lens having negative power, a second lens having negative power, a third lens having positive power, and a fourth lens having positive power, the fourth lens being a cemented lens. In this document, the cemented surfaces of the two lens constituting the fourth lens, i.e., the image side lens surface of the object side lens and the object side lens surface of the image side lens constituting the fourth lens, are both aspheric in shape.

PRIOR ART DOCUMENT

Patent Document

Patent Document 1: JP 2006-284620 A

SUMMARY OF THE INVENTION

Problems to be Solved by the Invention

The cemented lens is configured by cementing two lenses (an object side lens and an image side lens) using an acrylic resin adhesive. In the cemented lens, the resin adhesive layer formed between the two lenses by the resin adhesive should be formed extremely thin, and the thickness of the resin adhesive layer is commonly 5 to 10 μm. This is because when the resin adhesive layer is thicker, it has the negative effect of causing the field curvature in the tangential surface to shift to the plus side, in comparison with a simulation of the optical properties of the imaging lens during the designing.

A possible solution to satisfactorily correct various forms of aberration is to fashion the image side lens surface of the object lens and the object side lens surface of the image side lens constituting the cemented lens into different aspheric shapes. However, when the shapes cemented surfaces are different from each other and the resin adhesive layer is thinned, there is a greater danger of these cemented surfaces coming in contact with each other during the bonding operation and the cemented surfaces being damaged. When the gap between the cemented surfaces of the lenses is narrowed in order to thin the resin adhesive layer, the resin adhesive does not fill in between the cemented surfaces, and air bubbles sometimes remain between the object side lens and the image side lens.

In view of such matters, a problem of the present invention is to provide a high-resolution imaging lens comprising four lenses including an easily manufactured cemented lens.

Means to Solve the Problems

To solve the problem described above, an imaging lens of the present invention is characterized in comprising, in order from an object side to an image side:

a first lens having negative power, a second lens having negative power, a third lens having positive power, and a fourth lens having positive power;

the fourth lens being a cemented lens composed of an object side lens having negative power and an image side lens having positive power, and being provided with a resin adhesive layer bonding the object side lens and the image side lens together;

an image side lens surface of the object side lens and an object side lens surface of the image side lens having different aspheric shapes; and the following conditional expressions (1) and (2) being satisfied, where D represents the thickness of the adhesive resin layer along an optical axis, Sg1H represents sag at height H in the effective diameter of the image side lens surface of the object side lens in a direction orthogonal to the optical axis, and Sg2H represents sag in the object side lens surface of the image side lens at height H.

$$20 \text{ μm} \leq D \quad (1)$$

$$Sg1H \leq Sg2H \quad (2)$$

According to the present invention, the image side lens surface of the object side lens and the object side lens surface of the image side lens, which are the cemented surfaces of the two lenses constituting the cemented lens, have different aspheric shapes. As a result, it is easy to correct various forms of aberration such as chromatic aberration using the cemented lens, and the imaging lens can therefore be made high resolution. Because the conditional expressions (1) and (2) are satisfied, it is possible to increase the thickness of the adhesive resin layer between the image side lens surface of the object side lens and the object side lens surface of the image side lens which have different aspheric shapes, or in other words, to widen that gap between the cemented surfaces of the two lenses constituting the cemented lens. Therefore, it is possible to prevent or suppress instances in which the cemented surfaces come in contact with each other during the bonding operation of bonding the two lenses, and the cemented surfaces are damaged. Because of the wide gap between the cemented surfaces, the resin adhesive easily fills in between the cemented surfaces, and air bubbles can be prevented from remaining between the two lenses. Therefore, manufacturing the cemented lens is easy. Furthermore, the imaging lens can be designed with a gap of 20 μm or greater set in advance along the optical axis between the image side lens surface of the object side lens and the object side lens surface of the image side lens constituting the cemented lens, it is therefore possible to design the imaging lens while accounting for plus-side shifting of the field curvature in the tangential surface, and plus-side shifting of the field curvature can be suppressed by the design. The amount of sag is the distance along the optical axis from a reference plane to a lens surface at height H in the effective diameter in a direction orthogonal to the optical axis, the reference plane being a flat plane orthogonal to the optical axis and including the point of intersection between the lens surface and the optical axis. Furthermore, in the imaging lens of the present invention, it is possible to prevent or suppress the occurrence of focus misalignment between photographing using a visible light ray and photographing using a near infrared ray. Therefore, it is possible to install the imaging lens in an imaging device or the like which photographs utilizing a visible light ray and also photographs utilizing light rays in the range of 800 nm to 1100 nm, for example, such as a near infrared ray including a wavelength of 850 nm. A visible light ray is a light ray with a wavelength in the range of 400 nm or greater, to less than 700 nm.

In the present invention, the following conditional expression (3) is preferably satisfied.

$$D \leq 100 \ \mu m \quad (3)$$

If so, plus-side shifting of the field curvature in the tangential surface, caused by widening of the gap between the object side lens and the image side lens, can be accommodated to an extent at which correction is still possible.

In the present invention, the following conditional expression (4) is preferably satisfied, where f represents the focal point distance of the entire lens system, and Rs represents the radius of curvature of the image side lens surface of the object side lens.

$$0.9 \leq Rs/f \leq 1.3 \quad (4)$$

When Rs/f falls below the lower limit of conditional expression (4), the curvature of the cemented surfaces becomes large; therefore, cementing with the image side lens is no longer easy and the work of cementing the cemented lens becomes difficult. When the upper limit of conditional expression (4) is exceeded, it is difficult to correct chromatic aberration.

In the present invention, the following conditional expression (5) is preferably satisfied, where f represents the focal point distance of the entire lens system, f41 represents the focal point distance of the object side lens, and f42 represents the focal point distance of the image side lens.

$$-3.0 \leq (f41/f42)/f \leq -1.5 \quad (5)$$

When (f41/f42)/f falls below the lower limit of conditional expression (5), it is difficult to achieve balance with axial chromatic aberration and magnification chromatic aberration, leading to loss of resolution in the peripheral portions of the image. When the upper limit of conditional expression (5) is exceeded, it is difficult to correct chromatic aberration. The upper limit and lower limit of conditional expression (5) are values that take into account axial chromatic aberration and magnification chromatic aberration in cases of utilizing a near infrared ray in a range including an 850 nm wavelength for imaging, and in cases of utilizing a visible light ray, the lower limit is preferably −2.5.

To make the imaging lens a wide angle lens in the present invention, preferably, the first lens is a meniscus lens having a convex shape in the object side lens surface, the object side lens surface of the second lens has a concave shape, the third lens has a convex shape in the object side lens surface, and conditional expression (6) below is satisfied, where R31 represents the radius of curvature of the object side lens surface of the third lens and R32 represents the radius of curvature of the image side lens surface of the third lens.

$$R31 \leq |R32| \quad (6)$$

In this case, the imaging lens of the present invention can be a wide angle lens with a half angle of view of 80° or greater.

To satisfactorily correct chromatic aberration in the present invention, the first lens, second lens, and image side lens preferably have an Abbe number of 40 or greater, and the third lens and object side lens preferably have an Abbe number of 31 or less.

The imaging device of the present invention according to another aspect is characterized in comprising the imaging lens described above, and an image pick-up device arranged in a focal point position of the imaging lens.

According to the present invention, because the imaging lens can be made high resolution, the imaging device can be made high resolution by installing an image pick-up device having a large number of pixels.

The imaging device of the present invention according to another aspect is characterized in comprising the imaging lens described above, an image pick-up device arranged in the focal point position of the imaging lens, and an optical filter for transmitting a visible light ray and a near infrared ray in a band including a wavelength of 850 nm, the optical filter being arranged either on the object side of the imaging lens or between the imaging lens and the image pick-up device.

According to the present invention, the imaging lens prevents or suppresses the occurrence of focus misalignment between photographing using a visible light ray and photographing using a light ray of a predetermined range within the infrared range. Therefore, it is easy to configure an imaging device that uses the imaging lens to capture images utilizing a near infrared ray and a visible light ray.

Effect of the Invention

According to the present invention, because the cemented surfaces of the two lenses constituting the cemented lens have different aspheric shapes, it is easy to correct various forms of aberration such as chromatic aberration using the cemented lens, and the imaging lens can be made high resolution. Because conditional expressions (1) and (2) are satisfied, it is possible to prevent or suppress instances of the cemented surfaces coming in contact with each other and the cemented surfaces being damaged during the bonding operation of bonding the two lenses. The resin adhesive easily fills in between the cemented surfaces, and air bubbles can be prevented from remaining in between the two lenses. Therefore, manufacturing the cemented lens is easy. Furthermore, the imaging lens can be designed with a gap of 20 μm or greater set in advance along the optical axis between the image side lens surface of the object side lens and the object side lens surface of the image side lens constituting the cemented lens, and plus-side shifting of the field curvature in the tangential surface can therefore be suppressed by the design. According to the present invention, it is possible to prevent or suppress the occurrence of focus misalignment between photographing using a visible light ray and photographing using a near infrared ray.

MODE FOR CARRYING OUT THE INVENTION

An imaging lens to which the present invention is applied is described below with reference to the drawings.

Example 1

Figure 1:
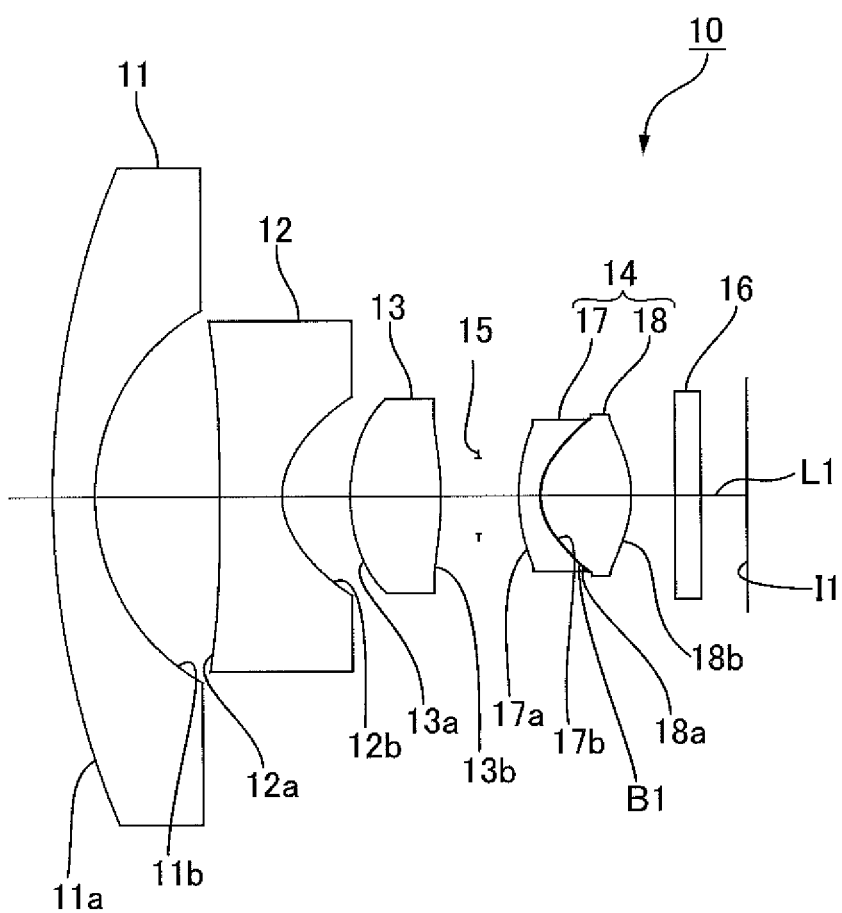
FIG. 1 is a configuration diagram of an imaging lens of Example 1 to which the present invention is applied.

FIG. 1 is a configuration diagram (light ray diagram) of an imaging lens of Example 1. An imaging lens 10 of the present example comprises, in order from an object side to an image side, a first lens 11 having negative power, a second lens 12 having negative power, a third lens 13 having positive power, and a fourth lens 14 having positive power. A diaphragm 15 is arranged between the third lens 13 and the fourth lens 14, and plate glass 16 is disposed on the image side of the fourth lens 14. An image-forming surface I1 is in a separate position from the plate glass 16. The fourth lens 14 is a cemented lens comprising an object side lens 17 having negative power and an image side lens 18 having positive power. The object side lens 17 and the image side lens 18 are bonded by a resin adhesive, and a resin adhesive layer B1 is formed between the object side lens 17 and the image side lens 18.

In the first lens 11, an object side lens surface 11a is a meniscus lens protruding toward the object side. The object side lens surface 11a and an image side lens surface 11b of the first lens 11 both have positive curvature.

In the second lens 12, an object side lens surface 12a has negative curvature, and an image side lens surface 12b has positive curvature. Therefore, the object side lens surface 12a has a concave curved portion that caves to the image side along the optical axis L1, and the image side lens surface 12b has a concave curved portion that caves to the object side along the optical axis L1. The object side lens surface 12a and the image side lens surface 12b are aspheric in shape.

In the third lens 13, an object side lens surface 13a has positive curvature, and an image side lens surface 13b has positive curvature. Therefore, the object side lens surface 13a has a convex curved portion that protrudes to the object side along the optical axis L1, and the image side lens surface 13b has a convex curved portion that protrudes to the image side along the optical axis L1. The object side lens surface 13a and the image side lens surface 13b of the third lens 13 are aspheric in shape.

In an object side lens 17 of the fourth lens 14, an object side lens surface 17a has positive curvature, and an image side lens surface 17b has positive curvature. Therefore, the object side lens surface 17a has a convex curved portion that protrudes to the object side along the optical axis L1, and the image side lens surface 17b has a concave curved portion that caves to the object side along the optical axis L1. The object side lens surface 17a and the image side lens surface 17b of the object side lens 17 are aspheric in shape.

In the image side lens 18 of the fourth lens 14, an object side lens surface 18a has positive curvature, and an image side lens surface 18b has negative curvature. Therefore, the object side lens surface 18a has a convex curved portion that protrudes to the object side along the optical axis L1, and the image side lens surface 18b has a convex curved portion that protrudes to the image side along the optical axis L1. The object side lens surface 18a and the image side lens surface 18b of the image side lens 18 are aspheric in shape.

Figure 2:
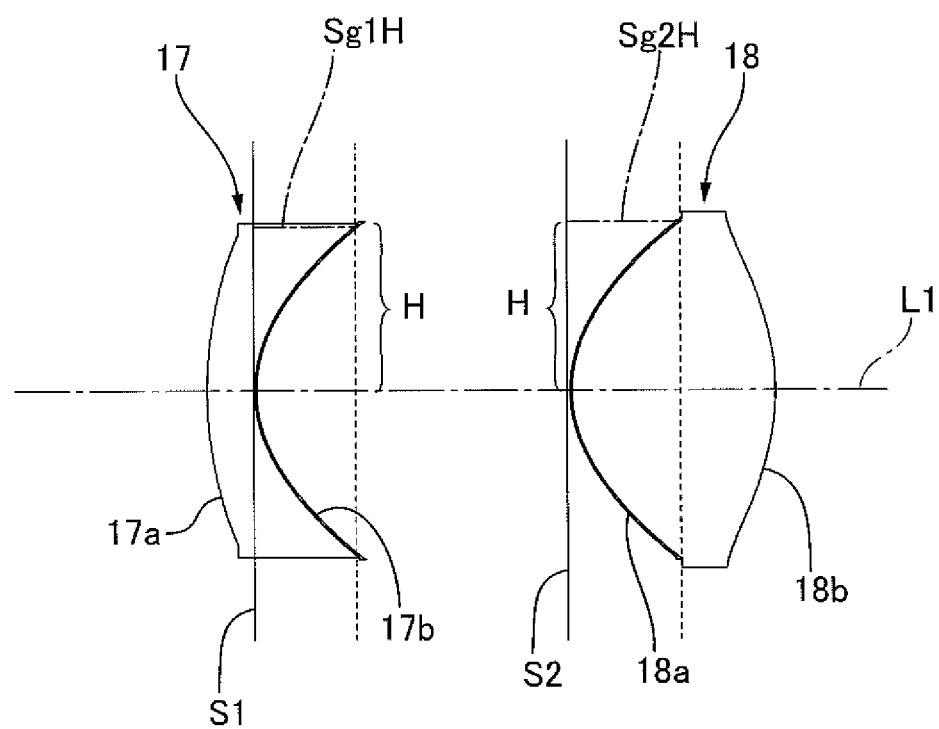
FIG. 2 is an explanatory diagram of the amount of sag.

The image side lens surface 17b of the object side lens 17 and the object side lens surface 18a of the image side lens 18, which constitute the cemented surfaces of the object side lens 17 and the image side lens 18, have different aspheric shapes. When D is the thickness of the resin adhesive layer B1 on the optical axis L1, Sg1H is the amount of sag in the image side lens surface 17b of the object side lens 17 at height H in the effective diameter of the image side lens surface 17b of the object side lens 17 in a direction orthogonal to the optical axis L1, and Sg2H is the amount of sag in the object side lens surface 18a of the image side lens 18 at height H, then the imaging lens 10 of the present example satisfies the conditional expressions (1) and (2) below. The amount of sag is the distance along the optical axis L1 from a reference plane to a lens surface at height H in the effective diameter of the image side lens surface 17b of the object side lens 17 in a direction orthogonal to the optical axis L1, the reference plane being a flat plane orthogonal to the optical axis L1 and including the point of intersection between the lens surface and the optical axis L1. FIG. 2 is an explanatory diagram of the amount of sag, wherein S1 indicates a reference plane relative to the image side lens surface 17b of the object side lens 17, and S2 indicates a reference plane relative to the object side lens surface 18a of the image side lens 18.

$$20\ \mu m \leq D \quad (1)$$

$$Sg1H \leq Sg2H \quad (2)$$

The conditional expressions (1) and (2) stipulate the thickness of the resin adhesive layer B1 between the image side lens surface 17b of the object side lens 17 and the object side lens surface 18a of the image side lens 18 which have different aspheric shapes, or in other words, the gap between the image side lens surface 17b of the object side lens 17 and the object side lens surface 18a of the image side lens 18, which are the cemented surfaces of the two lenses constituting the cemented lens.

Because the imaging lens 10 of the present example satisfies the conditional expressions (1) and (2), the gap between the image side lens surface 17b of the object side lens 17 and the object side lens surface 18a of the image side lens 18 can be enlarged. Therefore, during the bonding operation of bonding the object side lens 17 and the image side lens 18, it is possible to prevent or suppress contact between the image side lens surface 17b of the object side lens 17 and the object side lens surface 18a of the image side lens 18, as well as any damage that may occur on these lens surfaces. Because there is a large gap between the image side lens surface 17b of the object side lens 17 and the object side lens surface 18a of the image side lens 18, the resin adhesive easily fills in between the lens surfaces, and air bubbles can be prevented from remaining in between the two lenses.

The imaging lens 10 of the present example satisfies the following conditional expression (3).

$$D \leq 100\ \mu m \quad (3)$$

The purpose of conditional expression (3) is to suppress the increase in the plus-side shift of the field curvature in a tangential surface. When the upper limit of conditional expression (3) is exceeded, the plus-side shift of the field curvature becomes larger and difficult to correct. In the present example, because D is equal to 20 μm, the plus-side shift of the field of curvature in the tangential surface can be corrected by the design.

Furthermore, when Rs is the radius of curvature of the image side lens surface 17b of the object side lens 17 and f is the focal point distance of the entire lens system, the imaging lens 10 of the present example satisfies the following conditional expression (4).

$$0.9 \leq Rs/f \leq 1.3 \quad (4)$$

When Rs/f falls below the lower limit of conditional expression (4), the curvature of the image side lens surface 17b of the object side lens 17 becomes large; therefore, cementing with the image side lens 18 is no longer easy and the work of cementing the cemented lens becomes difficult. When the upper limit of conditional expression (4) is exceeded, it is difficult to correct chromatic aberration. Because Rs/f is equal to 1.077 in the present example, it is easy to cement the cemented lens and chromatic aberration is corrected satisfactorily.

When f is the focal point distance of the entire lens system, f41 is the focal point distance of the object side lens 17, and f42 is the focal point distance of the image side lens 18, the imaging lens 10 of the present example satisfies the following conditional expression (5).

$$-3.0 \leq (f41/f42)/f \leq -1.5 \quad (5)$$

When (f41/f42)/f falls below the lower limit of conditional expression (5), it is difficult to achieve balance with axial chromatic aberration and magnification chromatic aberration, leading to loss of resolution in the peripheral portions of the image. When the upper limit of conditional expression (5) is exceeded, it is difficult to correct chromatic aberration. Because (f41/f42)/f is equal to −1.54 in the present example, the decrease in resolution can be suppressed, and chromatic aberration is corrected satisfactorily.

In the imaging lens 10 of the present example, when R31 is the radius of curvature of the object side lens surface 13a of the third lens 13 and R32 is the radius of curvature of the image side lens surface 13b of the third lens 13, R31 is equal to 3.573, R32 is equal to −5.766, and the following conditional expression (6) is satisfied.

$$R31 \leq |R32| \quad (6)$$

In the imaging lens 10 of the present example, the Abbe number of the first lens 11, the second lens 12, and the image side lens 18 is 40 or greater, and the Abbe number of the third lens 13 and the object side lens 17 is 31 or less, whereby chromatic aberration is corrected.

When the F number of the imaging lens 10 of the present example is Fno, the half angle of view is ω, and the entire length of the lens system is L, these values are as follows.

Fno=2.0
ω=99.4°
L=16.089 mm

When f represents the focal point distance of the entire lens system, f1 represents the focal point distance of the first lens 11, f2 represents the focal point distance of the second lens 12, f3 represents the focal point distance of the third lens 13, f4 represents the focal point distance of the fourth lens 14, f41 represents the focal point distance of the object side lens 17, and f42 represents the focal point distance of the image side lens 18, these values are as follows.

f=1.155 mm
f1=−8.193 mm
f2=−2.685 mm
f3=4.126 mm
f4=3.275 mm
f41=−3.351 mm
f42=1.885 mm

Next, table 1A shows lens data of the lens surfaces of the imaging lens 10. In table 1A, the lens surfaces are specified in order counting from the object side. Lens surfaces marked with an asterisk are aspheric. Surface 7 is the diaphragm 15, and surfaces 12 and 13 are the object side glass surface and the image side glass surface of the plate glass 16. Radius of curvature and gap are in units of millimeters. The values of Nd (refractive index) and vd (Abbe number) of surface 10 represent values of the resin adhesive layer B1.

TABLE 1A

| Surface | Radius of Curvature | Gap | Nd (ref. index) | Vd (Abbe no.) |
|---|---|---|---|---|
| 1 | 17.158 | 1.000 | 1.77250 | 49.6 |
| 2 | 4.506 | 2.903 | | |
| 3* | −56.607 | 1.415 | 1.53461 | 56.0 |
| 4* | 1.485 | 1.595 | | |
| 5* | 3.573 | 2.087 | 1.58246 | 30.1 |
| 6* | −5.766 | 0.866 | | |
| 7 | infinity | 0.923 | | |
| 8* | 3.465 | 0.500 | 1.63494 | 24.0 |
| 9* | 1.244 | 0.020 | 1.50000 | 50.0 |
| 10* | 1.251 | 2.107 | 1.53461 | 56.0 |
| 11* | −2.145 | 1.000 | | |
| 12 | infinity | 0.600 | 1.51680 | 64.2 |
| 13 | infinity | 1.074 | | |

Next, table 1B shows aspheric coefficients for stipulating the aspheric shapes of the aspheric lens surfaces. The lens surfaces are specified in order counting from the object side in table 1B as well.

TABLE 1B

| | 3rd surface | 4th surface | 5th surface | 6th surface | 8th surface |
|---|---|---|---|---|---|
| K | −2.84625E+01 | −1.40499E+00 | −5.08590E+00 | 0.00000E+00 | 1.31742E+00 |
| A4 | −7.73159E−04 | 9.48358E−03 | 1.29842E−02 | 1.24404E−02 | −1.27224E−02 |
| A6 | 8.83607E−06 | 8.23544E−04 | 7.37044E−04 | −2.28103E−03 | 1.37903E−03 |
| A8 | 8.27198E−07 | 2.00365E−04 | −8.09568E−05 | 9.57643E−04 | 0.00000E+00 |
| A10 | −2.49701E−08 | −3.23758E−05 | 1.68861E−06 | −9.26933E−05 | 0.00000E+00 |
| A12 | 0.00000E+00 | 0.00000E+00 | 2.05962E−06 | 0.00000E+00 | 0.00000E+00 |
| A14 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 |

| | 9th surface | 10th surface | 11th surface |
|---|---|---|---|
| K | −5.22053E−01 | −5.18954E−01 | −5.07127E−01 |
| A4 | 2.05512E−03 | 1.55213E−02 | 2.38843E−02 |
| A6 | −2.12211E−02 | −2.25983E−02 | −2.51814E−03 |
| A8 | −5.63452E−03 | −8.00738E−03 | 1.41188E−03 |
| A10 | 4.54812E−03 | 4.55649E−03 | −2.09677E−04 |
| A12 | −9.87494E−04 | −7.63457E−04 | 3.07858E−05 |
| A14 | 0.00000E+00 | 0.00000E+00 | 1.16261E−05 |
| A16 | 0.00000E+00 | 0.00000E+00 | 0.00000E+00 |

The aspheric shape employed for the lens surfaces is expressed by the following formula, wherein Y is the amount of sag, c is the inverse of the radius of curvature, K is the conical coefficient, h is the height of the light ray, and A4, A6, A8, A10, A12, A14, and A16 are aspheric coefficients of the fourth degree, the sixth degree, the eighth degree, the tenth degree, the twelfth degree, the fourteenth degree, and the sixteenth degree, respectively.

$$Y(h) = \frac{ch^2}{1 + \sqrt{1 - (K+1)c^2h^2}} + A_4h^4 + A_6h^6 + A_8h^8 + A_{10}h^{10} + A_{12}h^{12} + A_{14}h^{14} + A_{16}h^{16} \quad [\text{Formula 1}]$$

(Effects)

Figure 3A:
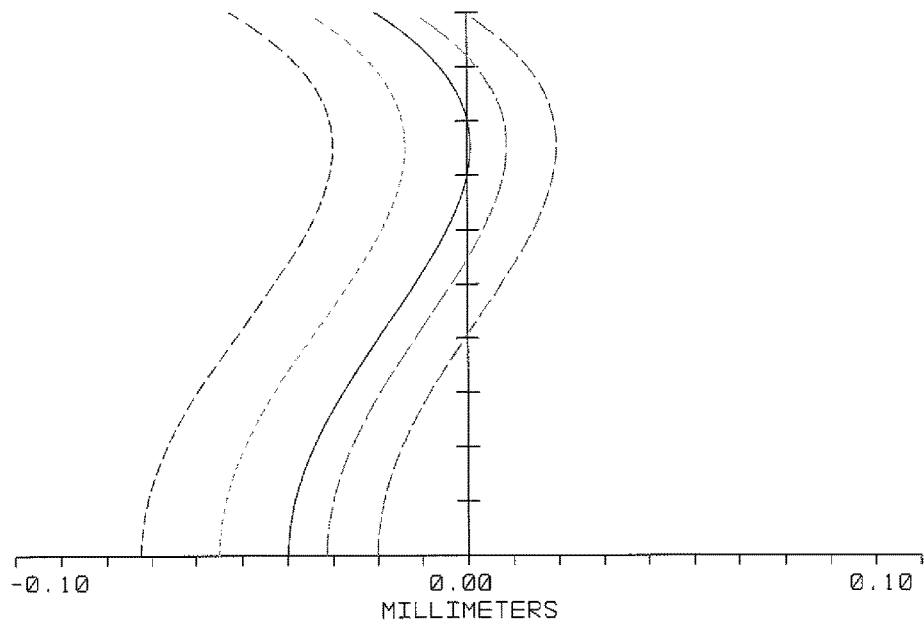
FIG. 3A is a longitudinal aberration graph of the imaging lens of FIG. 1.
Figure 3B:
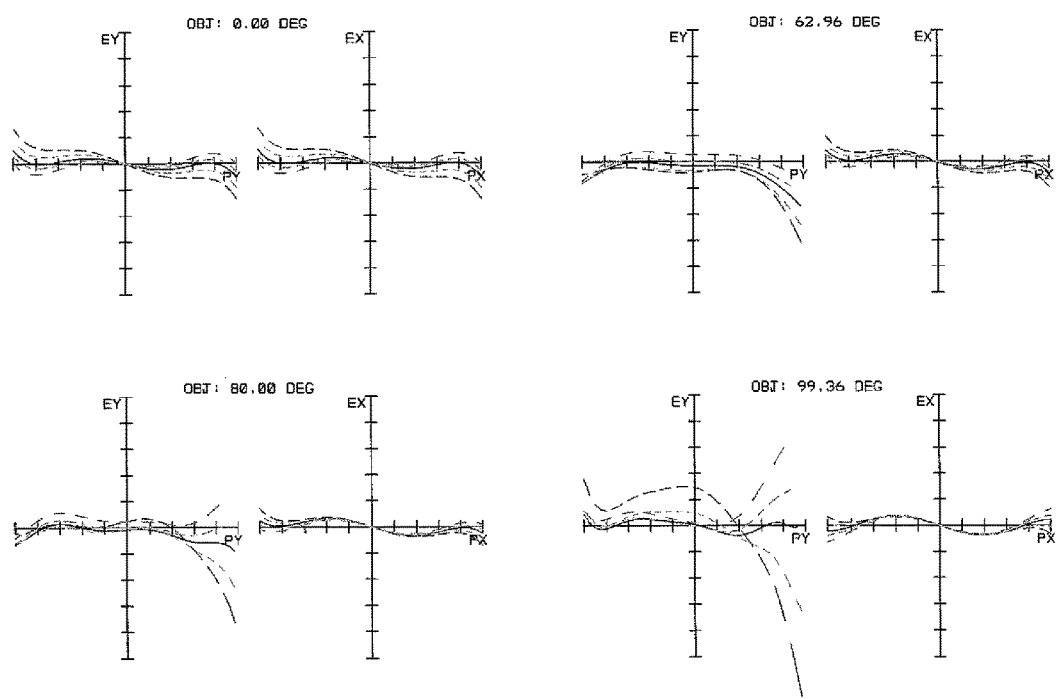
FIG. 3B is lateral aberration graphs of the imaging lens of FIG. 1.
Figure 3C:
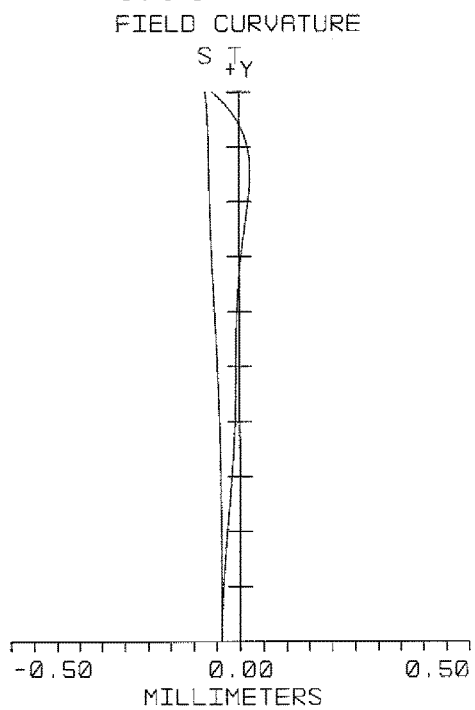
FIG. 3C is a field curvature graph of the imaging lens of FIG. 1.
Figure 3D:
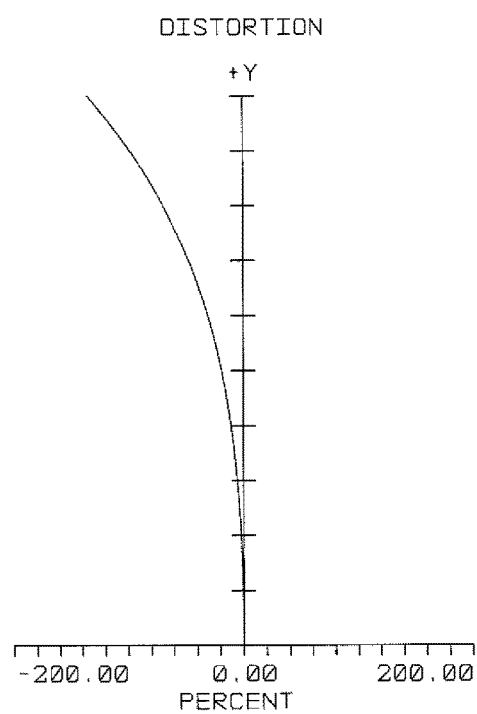
FIG. 3D is a distortion aberration graph of the imaging lens of FIG. 1.

FIGS. 3A to 3D are a longitudinal aberration graph, lateral aberration graphs, a field curvature graph, and a distortion aberration graph of the imaging lens 10. In the longitudinal aberration graph of FIG. 3A, the horizontal axis represents the position where the light ray crosses the optical axis L1, and the vertical axis represents the height at the pupil radius. In the lateral aberration graphs of FIG. 3B, the horizontal axes represent entrance pupil coordinates, and the vertical axes represent the amount of aberration. In FIGS. 3A and 3B, simulation results are shown for a plurality of light rays of different wavelengths. In the field curvature graph of FIG. 3C, the horizontal axis represents distance in the direction of the optical axis L1, and the vertical axis represents the height of the image. In FIG. 3C, S represents field curvature aberration in the sagittal plane, and T represents field curvature aberration in the tangential plane. In the distortion aberration graph of FIG. 3D, the horizontal axis represents the amount of image distortion, and the vertical axis represents the height of the image.

According to the imaging lens 10 of the present example, axial chromatic aberration is satisfactorily corrected as shown in FIG. 3A. Color bleeding is also suppressed as shown in FIG. 3B. Both axial chromatic aberration and magnification chromatic aberration are corrected in a balanced manner in the peripheral portions as well, as shown in FIGS. 3A and 3B. Furthermore, according to the imaging lens 10 of the present example, field curvature is satisfactorily corrected as shown in FIG. 3C. Therefore, the imaging lens 10 has high resolution.

In the present example, the imaging lens 10 is designed with a gap of 20 μm or greater set in advance on the optical axis L1, between the image side lens surface 17b of the object side lens 17 and the object side lens surface 18a of the image side lens 18. Therefore, when the lens is being designed, it is possible to account for plus-side shifting of the field curvature in the tangential plane, which occurs due to the resin adhesive layer B1 thickening. Therefore, according to the imaging lens 10 of the present example, plus-side shifting of the field curvature in the tangential plane is suppressed as shown in FIG. 3C.

Figure 4:
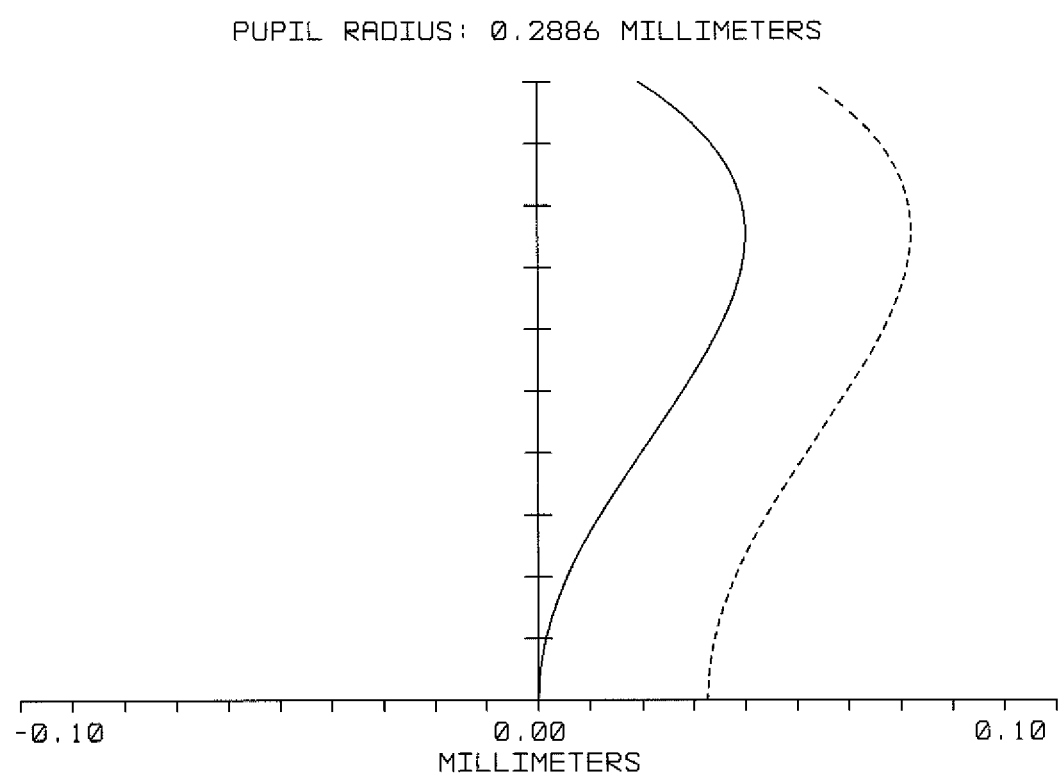
FIG. 4 is a spherical aberration graph of the imaging lens of FIG. 1.

Next, FIG. 4 is a spherical aberration graph of the imaging lens 10, wherein the solid line represents spherical aberration relative to a light ray with a wavelength of 588 nm (a visible light ray). The dashed line represents spherical aberration relative to a light ray with a wavelength of 850 nm (a near infrared ray). The horizontal axis of the spherical aberration graph represents the position where the light ray crosses the optical axis, and the vertical axis represents the height of the pupil radius. In the imaging lens 10, spherical aberration relative to a light ray with a wavelength of 850 nm is corrected as shown in FIG. 4, and there is no need for adjusting the focus between photographing under a visible light ray and photographing under a near infrared ray. In other words, in the imaging lens 10 of the present example, the occurrence of focus misalignment is suppressed between photographing using a visible light ray and photographing using a near infrared ray. In cases in which the fourth lens 14 is configured from a single lens that is not a cemented lens, it is difficult to correct both spherical aberration relative to a light ray with a wavelength of 588 nm (a visible light ray) and spherical aberration relative to a light ray with a wavelength of 850 nm (a near infrared ray) in a balanced manner, and also to ensure that focus misalignment does not occur between photographing using a visible light ray and photographing using a near infrared ray.

Example 2

Figure 5:
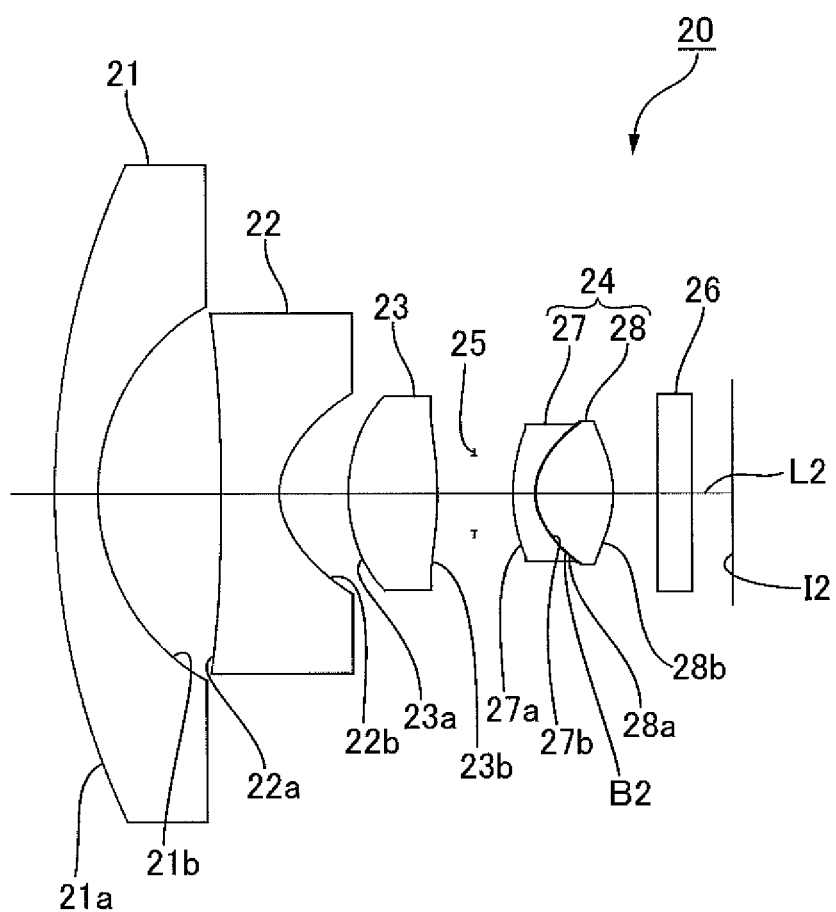
FIG. 5 is a configuration diagram of an imaging lens of Example 2 to which the present invention is applied.

FIG. 5 is a configuration diagram (light ray diagram) of an imaging lens of Example 2. An imaging lens 20 of the present example comprises, in order from an object side to an image side, a first lens 21 having negative power, a second lens 22 having negative power, a third lens 23 having positive power, and a fourth lens 24 having positive power, as shown in FIG. 5. A diaphragm 25 is disposed between the third lens 23 and the fourth lens 24, and plate glass 26 is disposed on the image side of the fourth lens 24. An image-forming surface I2 is in a separate position from the plate glass 26. The fourth lens 24 is a cemented lens comprising an object side lens 27 having negative power and an image side lens 28 having positive power. The object side lens 27 and the image side lens 28 are bonded by a resin adhesive, and a resin adhesive layer B2 is formed between the object side lens 27 and the image side lens 28. The shapes of the lenses constituting the imaging lens 20 of the present example are the same as the shapes of the lenses corresponding to the imaging lens 10 of Example 1, and descriptions thereof are therefore omitted.

When the F number of the imaging lens 20 of the present example is Fno, the half angle of view is ω, and the entire length of the lens system is L, these values are as follows.
Fno=2.0
ω=97.6°
L=15.598 mm When f is the focal point distance of the entire lens system, f1 is the focal point distance of the first lens 21, f2 is the focal point distance of the second lens 22, f3 is the focal point distance of the third lens 23, f4 is the focal point distance of the fourth lens 24, f41 is the focal point distance of the object side lens 27, and f42 is the focal point distance of the image side lens 28, these values are as follows.

f=1.141 mm
f1=−8.378 mm
f2=−2.600 mm
f3=4.060 mm
f4=3.199 mm
f41=−3.520 mm
f42=1.829 mm

In the imaging lens 20 of the present example, when D is the thickness of the resin adhesive layer B2 on the optical axis L2, Sg1H is the amount of sag in the image side lens surface 27b of the object side lens 27 at height H in the effective diameter of the image side lens surface 27b of the object side lens 27 in a direction orthogonal to the optical axis L2, Sg2H is the amount of sag in the object side lens surface 28a of the image side lens 28 at height H, Rs is the radius of curvature of the image side lens surface 27b of the object side lens 27, R31 is the radius of curvature of the object side lens surface 23a of the third lens 23, and R32 is the radius of curvature of the image side lens surface 23b of the third lens 23, then the conditional expressions (1) to (6) given in the description of Example 1 are satisfied, and the values of the conditional expressions (1) and (3) to (6) are as follows.

$$20 \ \mu m \leq D = 20 \ \mu m \tag{1}$$

$$Sg1H \leq Sg2H \tag{2}$$

$$D = 20 \ \mu m \leq 100 \ \mu m \tag{3}$$

$$0.9 \leq Rs/f = 1.112 \leq 1.3 \tag{4}$$

$$-3.0 \leq (f41/f42)/f = -1.69 \leq -1.5 \tag{5}$$

$$R31 = 3.428 \leq |R32| = |-5.958| \tag{6}$$

Furthermore, in the imaging lens 20 of the present example, the Abbe number of the first lens 21, the second lens 22, and the image side lens 28 is 40 or greater, and the Abbe number of the third lens 23 and the object side lens 27 is 31 or less, whereby chromatic aberration is corrected.

Next, table 2A shows lens data of the lens surfaces of the imaging lens 20. In table 2A, the lens surfaces are specified in order counting from the object side. Lens surfaces marked with an asterisk are aspheric. Surface 7 is the diaphragm 25, and surfaces 12 and 13 are the object side glass surface and the image side glass surface of the plate glass 26. Radius of curvature and gap are in units of millimeters. The values of Nd (refractive index) and vd (Abbe number) of the tenth surface represent values of the resin adhesive layer B2.

TABLE 2A

| Surface | Radius of Curvature | Gap | Nd (ref. index) | Vd (Abbe no.) |
|---|---|---|---|---|
| 1 | 16.082 | 1.000 | 1.77250 | 49.6 |
| 2 | 4.490 | 2.831 | | |
| 3* | −52.186 | 1.348 | 1.53461 | 56.0 |
| 4* | 1.441 | 1.594 | | |
| 5* | 3.428 | 2.037 | 1.58246 | 30.1 |
| 6* | −5.958 | 0.829 | | |
| 7 | infinity | 0.909 | | |
| 8* | 3.388 | 0.500 | 1.63494 | 24.0 |
| 9* | 1.269 | 0.020 | 1.50000 | 50.0 |
| 10* | 1.270 | 1.785 | 1.53461 | 56.0 |
| 11* | −2.169 | 1.000 | | |
| 12 | infinity | 0.800 | 1.51680 | 64.2 |
| 13 | infinity | 0.946 | | |

Next, table 2B shows aspheric coefficients for stipulating the aspheric shapes of the aspheric lens surfaces. The lens surfaces are specified in order counting from the object side in table 2B as well.

other words, in the imaging lens 20 of the present example, the occurrence of focus misalignment is suppressed between photographing using a visible light ray and photographing using a near infrared ray.

TABLE 2B

|     | 3rd surface  | 4th surface  | 5th surface  | 6th surface  | 8th surface  |
|-----|--------------|--------------|--------------|--------------|--------------|
| K   | −4.85524E+01 | −1.34758E+00 | −5.03141E+00 | 0.00000E+00  | 1.36928E+00  |
| A4  | −6.08537E−04 | 1.01062E−02  | 1.36480E−02  | 1.41031E−02  | −1.15999E−02 |
| A6  | 1.09398E−05  | 6.68407E−04  | 6.11024E−04  | −2.61724E−03 | 1.63819E−03  |
| A8  | 3.28794E−07  | 1.40973E−04  | −1.03327E−04 | 8.52922E−05  | 0.00000E+00  |
| A10 | −1.20383E−08 | −3.09290E−05 | 1.60209E−05  | −7.04918E−05 | 0.00000E+00  |
| A12 | 0.00000E+00  | 0.00000E+00  | 1.74143E−06  | 0.00000E+00  | 0.00000E+00  |
| A14 | 0.00000E+00  | 0.00000E+00  | 0.00000E+00  | 0.00000E+00  | 0.00000E+00  |
| A16 | 0.00000E+00  | 0.00000E+00  | 0.00000E+00  | 0.00000E+00  | 0.00000E+00  |

|     | 9th surface  | 10th surface | 11th surface |
|-----|--------------|--------------|--------------|
| K   | −4.83880E−01 | −4.77306E−01 | −5.52365E−01 |
| A4  | 5.41293E−03  | 9.13101E−02  | 2.11256E−02  |
| A6  | −1.93570E−02 | −1.66609E−02 | −1.21540E−03 |
| A8  | −4.66595E−03 | −8.41125E−03 | 1.48351E−03  |
| A10 | 4.64886E−03  | 5.56732E−03  | −2.54428E−04 |
| A12 | −9.51682E−04 | −8.11428E−04 | 2.89948E−05  |
| A14 | 0.00000E+00  | 0.00000E+00  | 1.92218E−05  |
| A16 | 0.00000E+00  | 0.00000E+00  | 0.00000E+00  |

(Effects)

Figure 6A:
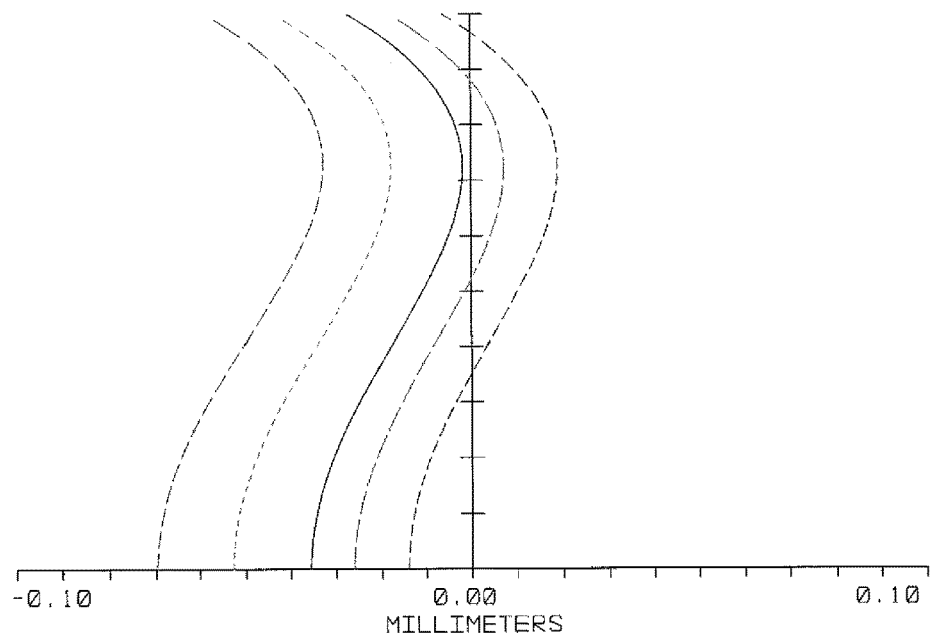
FIG. 6A is a longitudinal aberration graph of the imaging lens of FIG. 5.
Figure 6B:
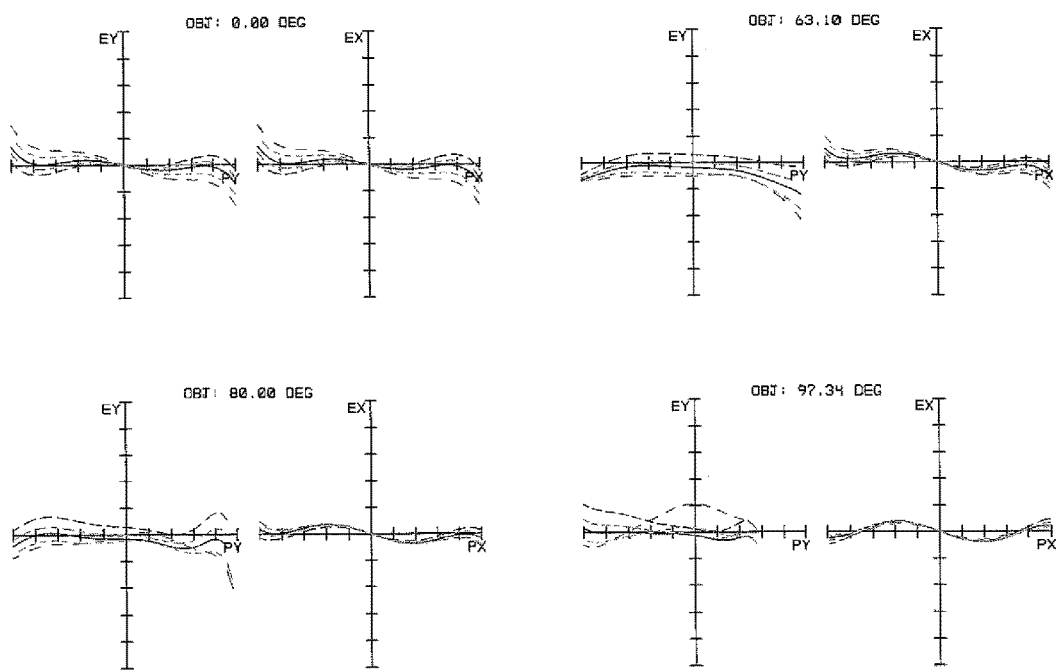
FIG. 6B is lateral aberration graphs of the imaging lens of FIG. 5.
Figure 6C:
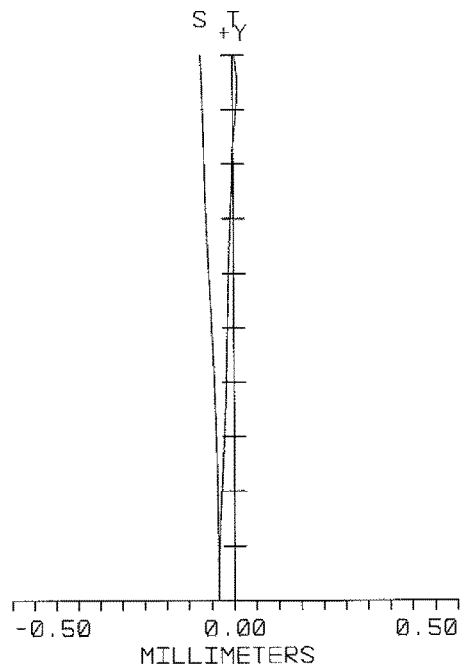
FIG. 6C is a field curvature graph of the imaging lens of FIG. 5.
Figure 6D:
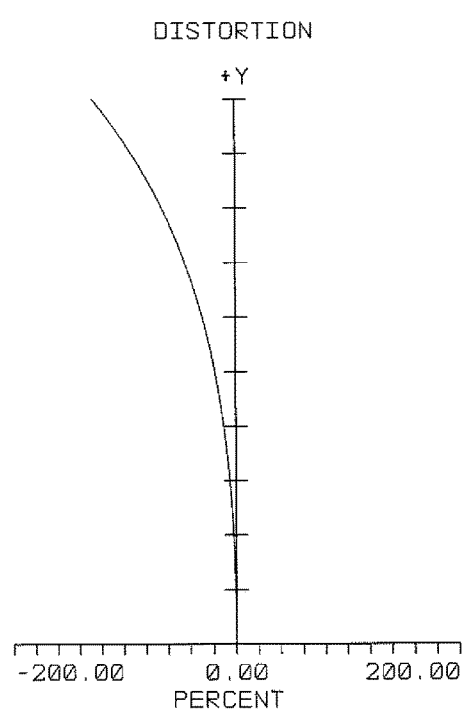
FIG. 6D is a distortion aberration graph of the imaging lens of FIG. 5.

FIGS. 6A to 6D are a longitudinal aberration graph, lateral aberration graphs, a field curvature graph, and a distortion aberration graph of the imaging lens 20. According to the imaging lens 20, axial chromatic aberration is satisfactorily corrected as shown in FIG. 6A. Color bleeding is also suppressed as shown in FIG. 6B. Both axial chromatic aberration and magnification chromatic aberration are corrected in a balanced manner in the peripheral portions as well, as shown in FIGS. 6A and 6B. Furthermore, according to the imaging lens 20 of the present example, field curvature is satisfactorily corrected as shown in FIG. 6C. Therefore, the imaging lens 20 has high resolution.

In the present example, the imaging lens 20 is designed with a gap of 20 μm or greater set in advance on the optical axis L2, between the image side lens surface 27b of the object side lens 27 and the object side lens surface 28a of the image side lens 28. Therefore, when the lens is being designed, it is possible to account for plus-side shifting of the field curvature in the tangential plane, which occurs due to the resin adhesive layer B2 thickening. Therefore, according to the imaging lens 20 of the present example, plus-side shifting of the field curvature in the tangential plane is suppressed as shown in FIG. 6C.

Figure 7:
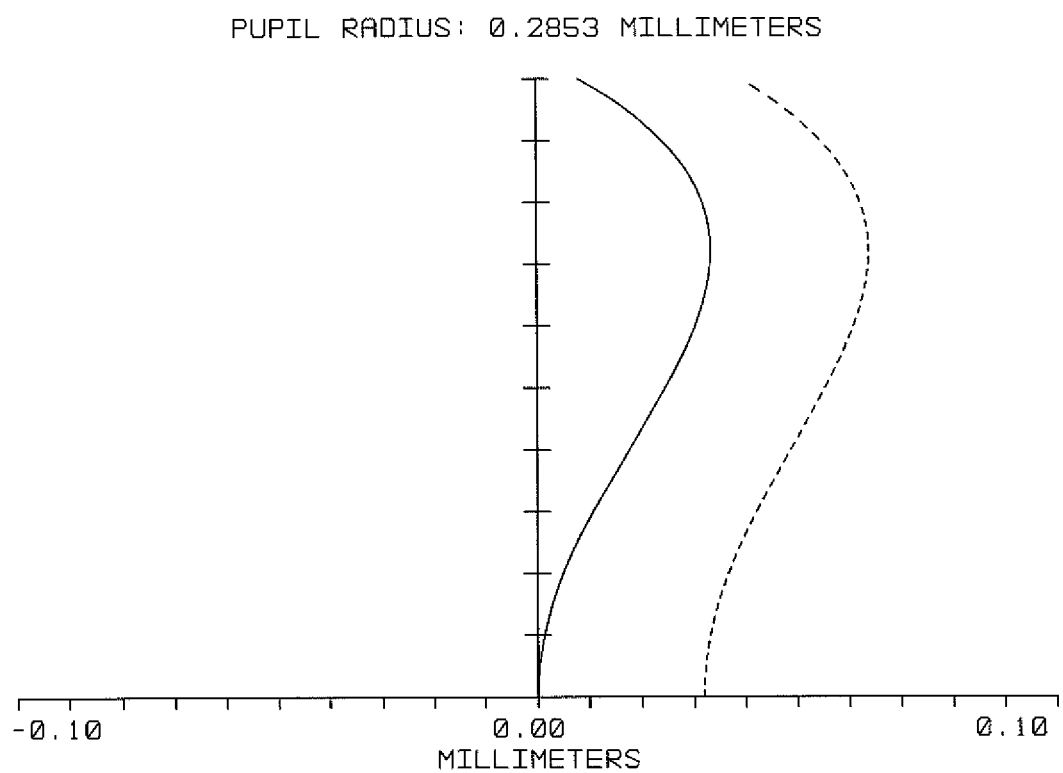
FIG. 7 is a spherical aberration graph of the imaging lens of FIG. 5.

Next, FIG. 7 is a spherical aberration graph of the imaging lens 20, wherein the solid line represents spherical aberration relative to a light ray with a wavelength of 588 nm (a visible light ray). The dashed line represents spherical aberration relative to a light ray with a wavelength of 850 nm (a near infrared ray). The horizontal axis of the spherical aberration graph represents the position where the light ray crosses the optical axis, and the vertical axis represents the height of the pupil radius. In the imaging lens 20, spherical aberration relative to a light ray with a wavelength of 850 nm is corrected as shown in FIG. 7, and there is no need for adjusting the focus between photographing under a visible light ray and photographing under a near infrared ray. In Example 3

Figure 8:
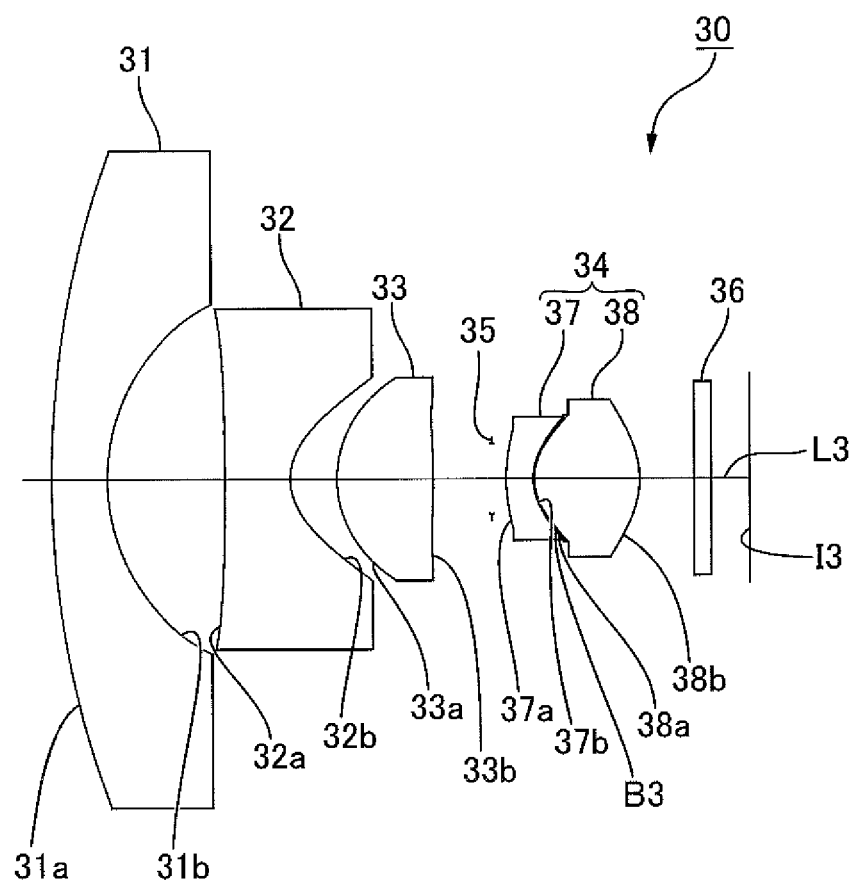
FIG. 8 is a configuration diagram of an imaging lens of Example 3 to which the present invention is applied.

FIG. 8 is a configuration diagram (light ray diagram) of an imaging lens of Example 3. An imaging lens 30 of the present example comprises, in order from an object side to an image side, a first lens 31 having negative power, a second lens 32 having negative power, a third lens 33 having positive power, and a fourth lens 34 having positive power, as shown in FIG. 8. A diaphragm 35 is disposed between the third lens 33 and the fourth lens 34, and plate glass 36 is disposed on the image side of the fourth lens 34. An image-forming surface I3 is in a separate position from the plate glass 36. The fourth lens 34 is a cemented lens comprising an object side lens 37 having negative power and an image side lens 38 having positive power. The object side lens 37 and the image side lens 38 are bonded by a resin adhesive, and a resin adhesive layer B3 is formed between the object side lens 37 and the image side lens 38. The shapes of the lenses constituting the imaging lens 30 of the present example are the same as the shapes of the lenses corresponding to the imaging lens 10 of Example 1, and descriptions thereof are therefore omitted.

When the F number of the imaging lens 30 of the present example is Fno, the half angle of view is ω, and the entire length of the lens system is L, these values are as follows.
Fno=2.0
ω=96.0°
L=12.637 mm When f represents the focal point distance of the entire lens system, f1 represents the focal point distance of the first lens 31, f2 represents the focal point distance of the second lens 32, f3 represents the focal point distance of the third lens 33, f4 represents the focal point distance of the fourth lens 34, f41 represents the focal point distance of the object side lens 37, and f42 represents the focal point distance of the image side lens 38 these values are as follows.
f=0.847 mm
f1=−5.553 mm
f2=−1.712 mm
f3=2.742 mm f4=2.317 mm f41=−2.670 mm f42=1.493 mm In the imaging lens 30 of the present example, when D represents the thickness of the resin adhesive layer B3 on the optical axis L3, Sg1H represents the amount of sag in the image side lens surface 37b of the object side lens 37 at height H in the effective diameter of the image side lens surface 37b of the object side lens 37 in a direction orthogonal to the optical axis L3, Sg2H represents the amount of sag in the object side lens surface 38a of the image side lens 38 at height H, Rs represents the radius of curvature of the image side lens surface 37b of the object side lens 37, R31 represents the radius of curvature of the object side lens surface 33a of the third lens 33, and R32 represents the radius of curvature of the image side lens surface 33b of the third lens 33, then the conditional expressions (1) to (6) given in the description of Example 1 are satisfied, and the values of the conditional expressions (1) and (3) to (6) are as follows.

TABLE 3A

| Surface | Radius of Curvature | Gap | Nd (ref. index) | Vd (Abbe no.) |
|---|---|---|---|---|
| 1 | 15.167 | 1.000 | 1.77250 | 49.6 |
| 2 | 3.248 | 2.137 | | |
| 3* | −82.115 | 1.192 | 1.53461 | 56.0 |
| 4* | 0.930 | 0.833 | | |
| 5* | 1.824 | 1.754 | 1.58246 | 30.1 |
| 6* | −8.292 | 1.047 | | |
| 7 | infinity | 0.267 | | |
| 8* | 2.522 | 0.500 | 1.63232 | 23.3 |
| 9* | 0.934 | 0.020 | 1.50000 | 50.0 |
| 10* | 0.985 | 1.881 | 1.53461 | 56.0 |
| 11* | −1.407 | 1.000 | | |
| 12 | infinity | 0.300 | 1.51680 | 64.2 |
| 13 | infinity | 0.707 | | |

Next, table 3B shows aspheric coefficients for stipulating the aspheric shapes of the aspheric lens surfaces. The lens surfaces are specified in order counting from the object side in table 3B as well.

TABLE 3B

| | 3rd surface | 4th surface | 5th surface | 6th surface | 8th surface |
|---|---|---|---|---|---|
| K | −3.60256E+0 | −1.06928E+OO | −1.33964E+00 | 0.00000E+00 | 2.70264E+00 |
| A4 | −1.66270E−03 | 2.14019E−02 | 3.98212E−02 | 4.99316E−02 | −6.76570E−02 |
| A6 | −2.50310E−05 | −1.35178E−02 | −1.87024E−03 | −2.94229E−02 | 0.00000E+00 |
| A8 | 4.90298E−06 | 3.07720E−03 | −1.72035E−03 | 1.41316E−02 | 0.00000E+00 |
| A10 | −3.49239E−07 | −4.65455E−04 | 8.49190E−04 | −2.20487E−03 | 0.00000E+00 |
| A12 | 0.00000E+00 | 0.00000E+00 | −6.45946E−05 | 0.00000E+00 | 0.00000E+00 |
| A14 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 |

| | 9th surface | 10th surface | 11th surface |
|---|---|---|---|
| K | −4.48387E−01 | −8.31760E−01 | −5.28763E−01 |
| A4 | −6.46831E02 | 1.97069E−01 | 6.63000E−02 |
| A6 | −6.49574E−02 | −2.33004E−01 | −3.07803E−02 |
| A8 | −1.82272E−01 | −5.31866E−02 | 2.74275E−02 |
| A10 | 2.14111E−01 | 8.43919E−02 | −8.24114E−03 |
| A12 | −7.23247E−02 | 0.00000E+00 | 1.10075E−03 |
| A14 | 0.00000E+00 | 0.00000E+00 | −2.46844E−04 |
| A16 | 0.00000E+00 | 0.00000E+00 | 0.00000E+00 |

$$20\ \mu m \leq D = 20\ \mu m \quad (1)$$

$$Sg1H \leq Sg2H \quad (2)$$

$$D = 20\ \mu m \leq 100\ \mu m \quad (3)$$

$$0.9 \leq Rs/f = 1.103 \leq 1.3 \quad (4)$$

$$-3.0 \leq (f41/f42)/f = -2.11 \leq -1.5 \quad (5)$$

$$R31 = 1.824 \leq |R32| = |-8.292| \quad (6)$$

Furthermore, in the imaging lens 30 of the present example, the Abbe number of the first lens 31, the second lens 32, and the image side lens 38 is 40 or greater, and the Abbe number of the third lens 33 and the object side lens 37 is 31 or less, whereby chromatic aberration is corrected.

Next, table 3A shows lens data of the lens surfaces of the imaging lens 30. In table 3A, the lens surfaces are specified in order counting from the object side. Lens surfaces marked with an asterisk are aspheric. Surface 7 is the diaphragm 35, and surfaces 12 and 13 are the object side glass surface and the image side glass surface of the plate glass 36. Radius of curvature and gap are in units of millimeters. The values of Nd (refractive index) and vd (Abbe number) of the tenth surface represent values of the resin adhesive layer B3.

(Effects)

Figure 9A:
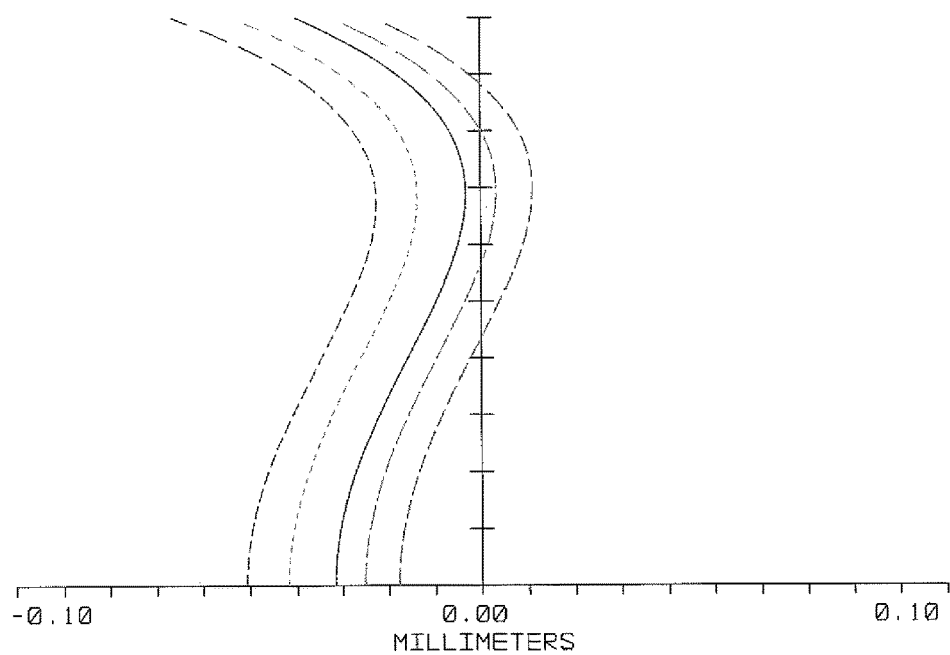
FIG. 9A is a longitudinal aberration graph of the imaging lens of FIG. 8.
Figure 9B:
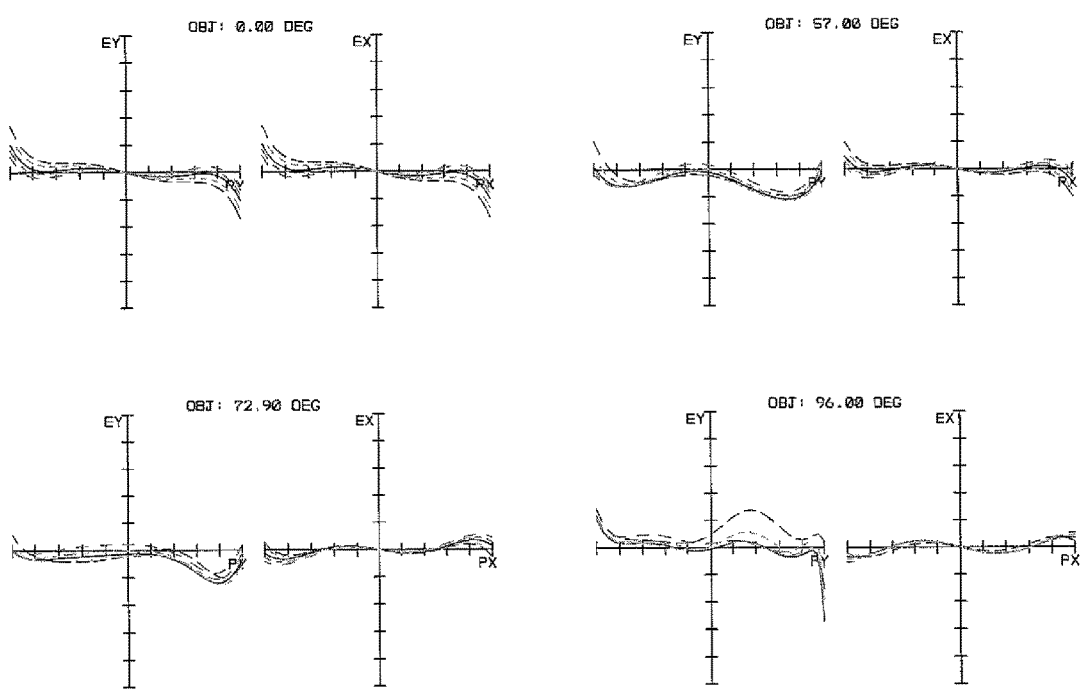
FIG. 9B is lateral aberration graphs of the imaging lens of FIG. 8.
Figure 9C:
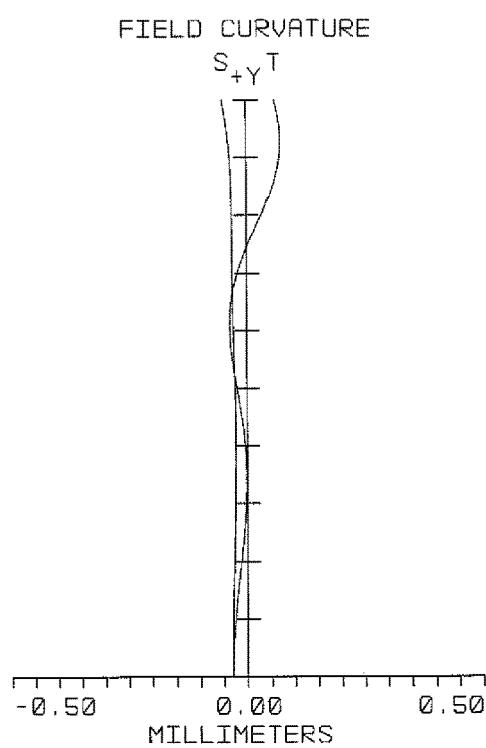
FIG. 9C is a field curvature graph of the imaging lens of FIG. 8.
Figure 9D:
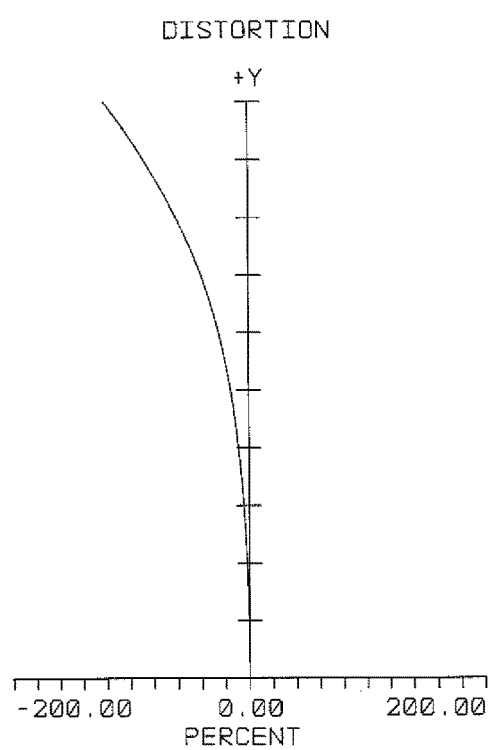
FIG. 9D is a distortion aberration graph of the imaging lens of FIG. 8.

FIGS. 9A to 9D are a longitudinal aberration graph, lateral aberration graphs, a field curvature graph, and a distortion aberration graph of the imaging lens 30. According to the imaging lens 30, axial chromatic aberration is satisfactorily corrected as shown in FIG. 9A. Color bleeding is also suppressed as shown in FIG. 9B. Both axial chromatic aberration and magnification chromatic aberration are corrected in a balanced manner in the peripheral portions as well, as shown in FIGS. 9A and 9B. Furthermore, according to the imaging lens 30 of the present example, field curvature is satisfactorily corrected as shown in FIG. 9C. Therefore, the imaging lens 30 has high resolution.

In the present example, the imaging lens 30 is designed with a gap of 20 μm or greater set in advance on the optical axis L3, between the image side lens surface 37b of the object side lens 37 and the object side lens surface 38a of the image side lens 38. Therefore, when the lens is being designed, it is possible to account for plus-side shifting of the field curvature in the tangential plane, which occurs due to the resin adhesive layer B3 thickening. Therefore, according to the imaging lens 30 of the present example, plus-side shifting of the field curvature in the tangential plane is suppressed as shown in FIG. 9C.

Figure 10:
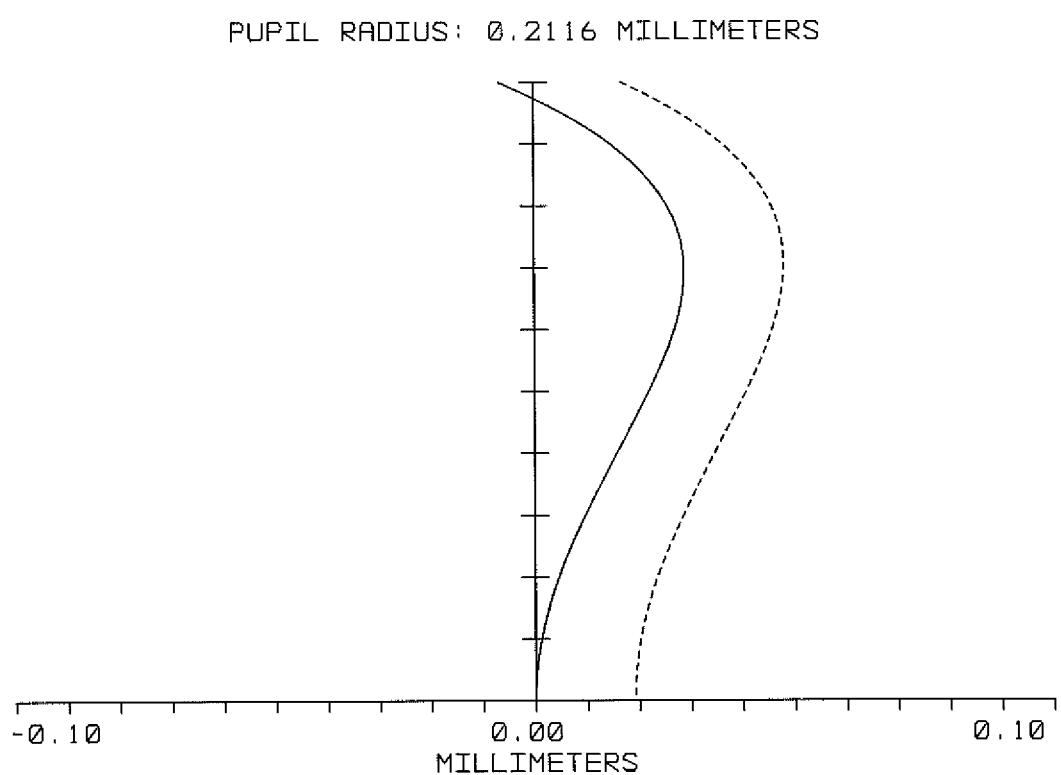
FIG. 10 is a spherical aberration graph of the imaging lens of FIG. 8.

Next, FIG. 10 is a spherical aberration graph of the imaging lens 30, wherein the solid line represents spherical aberration relative to a light ray with a wavelength of 588 nm (a visible light ray). The dashed line represents spherical aberration relative to a light ray with a wavelength of 850 nm (a near infrared ray). The horizontal axis of the spherical aberration graph represents the position where the light ray crosses the optical axis, and the vertical axis represents the height of the pupil radius. In the imaging lens 30, spherical aberration relative to a light ray with a wavelength of 850 nm is corrected as shown in FIG. 10, and there is no need for adjusting the focus between photographing under a visible light ray and photographing under a near infrared ray. In other words, in the imaging lens 30 of the present example, the occurrence of focus misalignment is suppressed between photographing using a visible light ray and photographing using a near infrared ray.

Example 4

Figure 11:
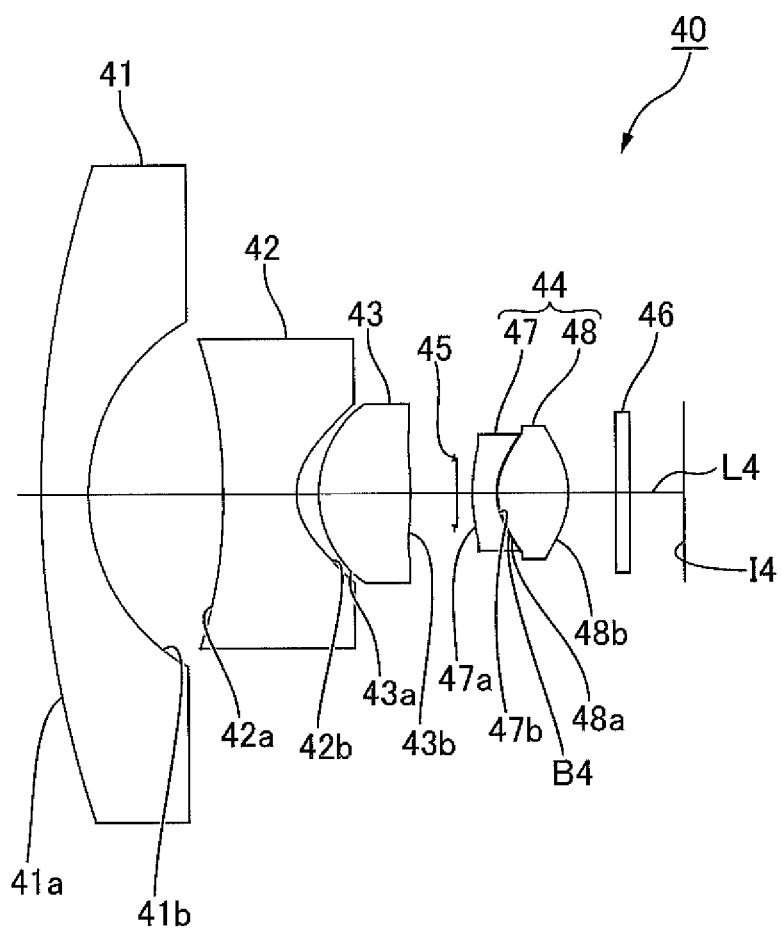
FIG. 11 is a configuration diagram of an imaging lens of Example 4 to which the present invention is applied.

FIG. 11 is a configuration diagram (light ray diagram) of an imaging lens of Example 4. An imaging lens 40 of the present example comprises, in order from an object side to an image side, a first lens 41 having negative power, a second lens 42 having negative power, a third lens 43 having positive power, and a fourth lens 44 having positive power, as shown in FIG. 8. A diaphragm 45 is disposed between the third lens 43 and the fourth lens 44, and plate glass 46 is disposed on the image side of the fourth lens 44. An image-forming surface 14 is in a separate position from the plate glass 46. The fourth lens 44 is a cemented lens comprising an object side lens 47 having negative power and an image side lens 48 having positive power. The object side lens 47 and the image side lens 48 are bonded by a resin adhesive, and a resin adhesive layer B4 is formed between the object side lens 47 and the image side lens 48. The shapes of the lenses constituting the imaging lens 40 of the present example are the same as the shapes of the lenses corresponding to the imaging lens 10 of Example 1, and descriptions thereof are therefore omitted.

When the F number of the imaging lens 40 of the present example is Fno, the half angle of view is ω, and the entire length of the lens system is L, these values are as follows.
Fno=2.0
ω=96.0°
L=13.514 mm When f represents the focal point distance of the entire lens system, f1 represents the focal point distance of the first lens 41, f2 represents the focal point distance of the second lens 42, f3 represents the focal point distance of the third lens 43, f4 represents the focal point distance of the fourth lens 44, f41 represents the focal point distance of the object side lens 47, and f42 represents the focal point distance of the image side lens 48, these values are as follows.
f=0.994 mm
f1=−8.279 mm
f2=−1.785 mm
f3=2.929 mm
f4=2.394 mm
f41=−3.114 mm
f42=1.479 mm In the imaging lens 40 of the present example, when D represents the thickness of the resin adhesive layer B4 on the optical axis L4, Sg1H represents the amount of sag in the image side lens surface 47b of the object side lens 47 at height H in the effective diameter of the image side lens surface 47b of the object side lens 47 in a direction orthogonal to the optical axis L4, Sg2H represents the amount of sag in the object side lens surface 48a of the image side lens 48 at height H, Rs represents the radius of curvature of the image side lens surface 47b of the object side lens 47, R31 represents the radius of curvature of the object side lens surface 43a of the third lens 43, and R32 represents the radius of curvature of the image side lens surface 43b of the third lens 43, then the conditional expressions (1) to (6) given in the description of Example 1 are satisfied, and the values of the conditional expressions (1) and (3) to (6) are as follows.

$$20 \ \mu m \leq D = 20 \ \mu m \tag{1}$$

$$Sg1H \leq Sg2H \tag{2}$$

$$D = 20 \ \mu m \leq 100 \ \mu m \tag{3}$$

$$0.9 \leq Rs/f = 1.189 \leq 1.3 \tag{4}$$

$$-3.0 \leq (f41/f42)/f = -2.12 \leq -1.5 \tag{5}$$

$$R31 = 2.115 \leq |R32-| = |-5.863| \tag{6}$$

Furthermore, in the imaging lens 40 of the present example, the Abbe number of the first lens 41, the second lens 42, and the image side lens 48 is 40 or greater, and the Abbe number of the third lens 43 and the object side lens 47 is 31 or less, whereby chromatic aberration is corrected.

Next, table 4A shows lens data of the lens surfaces of the imaging lens 40. In table 4A, the lens surfaces are specified in order counting from the object side. Lens surfaces marked with an asterisk are aspheric. Surface 7 is the diaphragm 45, and surfaces 12 and 13 are the object side glass surface and the image side glass surface of the plate glass 46. Radius of curvature and gap are in units of millimeters. The values of Nd (refractive index) and vd (Abbe number) of the tenth surface represent values of the resin adhesive layer B4.

TABLE 4A

| Surface | Radius of Curvature | Gap | Nd (ref. index) | Vd (Abbe no.) |
|---|---|---|---|---|
| 1 | 19.042 | 1.000 | 1.58913 | 61.3 |
| 2 | 3.807 | 2.812 | | |
| 3* | −11.513 | 1.548 | 1.54410 | 56.1 |
| 4* | 1.111 | 0.472 | | |
| 5* | 2.115 | 1.930 | 1.58250 | 30.2 |
| 6* | −5.863 | 0.929 | | |
| 7 | infinity | 0.371 | | |
| 8* | 3.389 | 0.500 | 1.63980 | 23.3 |
| 9* | 1.182 | 0.020 | 1.51313 | 53.9 |
| 10* | 1.135 | 1.489 | 1.54410 | 56.1 |
| 11* | −1.487 | 1.000 | | |
| 12 | infinity | 0.300 | 1.51680 | 64.2 |
| 13 | infinity | 1.143 | | |

Next, table 4B shows aspheric coefficients for stipulating the aspheric shapes of the aspheric lens surfaces. The lens surfaces are specified in order counting from the object side in table 4B as well.

TABLE 4B

|      | 3rd surface | 4th surface | 5th surface | 6th surface | 8th surface | 9th surface | 10th surface | 11th surface |
|------|-------------|-------------|-------------|-------------|-------------|-------------|--------------|--------------|
| K    | 0.00000E+00 | −1.14072E+00 | −1.65827E+00 | −6.16240E+00 | 3.81816E+00 | −3.72777E−01 | −4.73549E−01 | −4.35515E−01 |
| A4   | −1.60230E−03 | 1.77641E−02 | 3.73407E−02 | 4.78862E−02 | −4.94012E−02 | −1.04207E−02 | −6.80388E−02 | 4.43706E−02 |
| A6   | 6.88899E−06 | −1.55775E−02 | −3.26048E−03 | −1.99747E−02 | 1.07795E−01 | −1.42219E−01 | −6.47585E−02 | −1.90538E−02 |
| A8   | 8.41573E−06 | 2.55153E−03 | −1.80394E−03 | 1.50700E−03 | −3.28112E−01 | 1.30746E−03 | −1.30859E−02 | 2.58744E−02 |
| A10  | 6.48226E−08 | −2.92172E−05 | 9.45624E−04 | 1.79524E−02 | 4.00692E−01 | 3.22870E−02 | 1.30450E−02 | −8.505886E−03 |
| A12  | −1.39532E−08 | 5.56951E−06 | −4.05919E−05 | −1.36560E−02 | −9.62778E−02 | 1.66066E−02 | 1.64851E−02 | 1.57286E−03 |
| A14  | 0.00000E+00 | 0.00000E+00 | 0.00000E+00 | 4.66022E−03 | −1.32539E−01 | 3.12449E−03 | 1.03073E−02 | −7.60301E−05 |
| A16  | 0.00000E+00 | 0.00000E+00 | 0.00000E+00 | −6.74695E−04 | 6.80049E−02 | −9.02035E−03 | −1.04512E−02 | −1.29595E−04 |

(Effects)

Figure 12A:
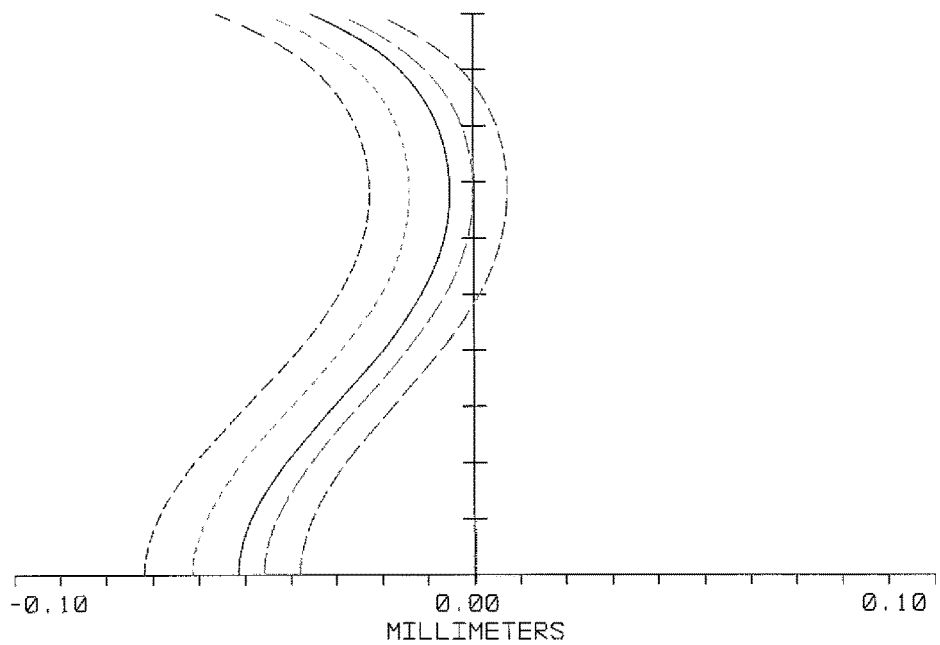
FIG. 12A is a longitudinal aberration graph of the imaging lens of FIG. 11.
Figure 12B:
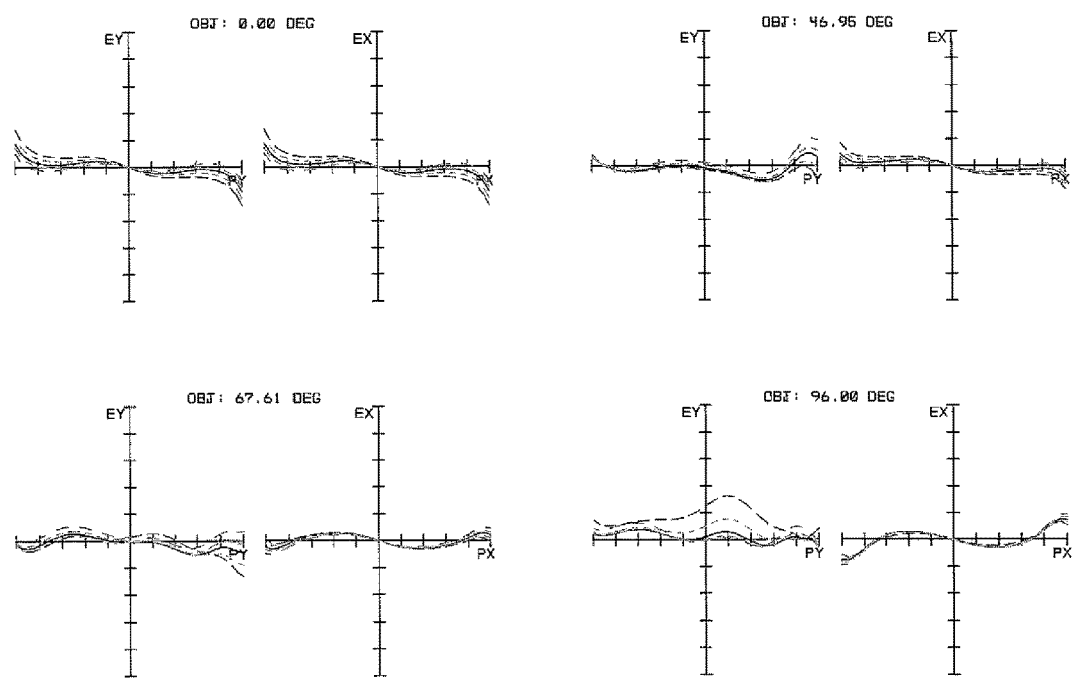
FIG. 12B is lateral aberration graphs of the imaging lens of FIG. 11.
Figure 12C:
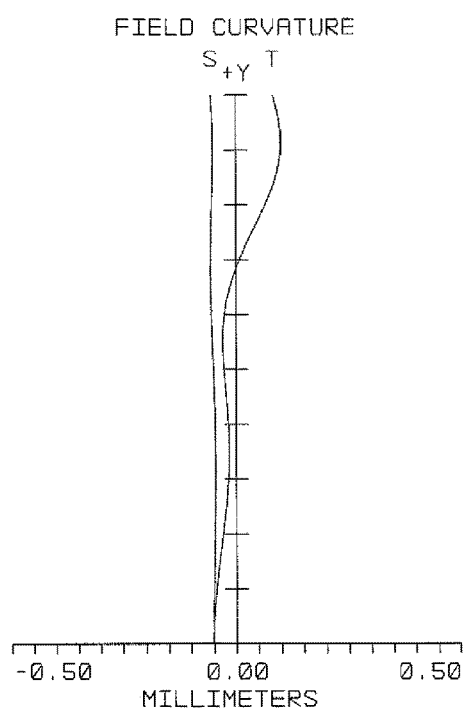
FIG. 12C is a field curvature graph of the imaging lens of FIG. 11.
Figure 12D:
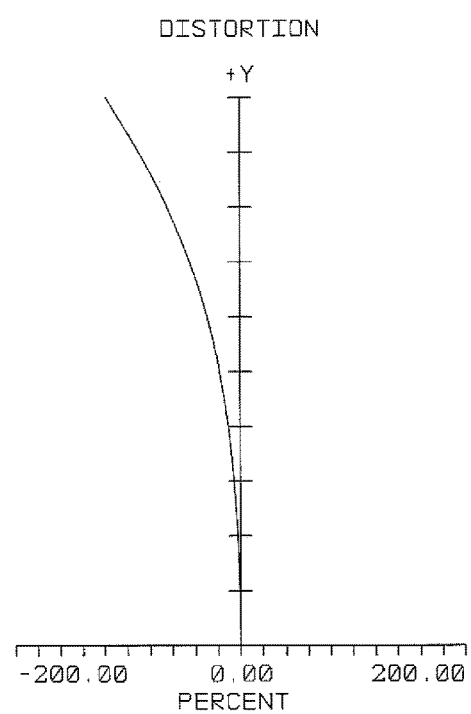
FIG. 12D is a distortion aberration graph of the imaging lens of FIG. 11.

FIGS. 12A to 12D are a longitudinal aberration graph, lateral aberration graphs, a field curvature graph, and a distortion aberration graph of the imaging lens 40. According to the imaging lens 40, axial chromatic aberration is satisfactorily corrected as shown in FIG. 12A. Color bleeding is also suppressed as shown in FIG. 12B. Both axial chromatic aberration and magnification chromatic aberration are corrected in a balanced manner in the peripheral portions as well, as shown in FIGS. 12A and 12B. Furthermore, according to the imaging lens 40 of the present example, field curvature is satisfactorily corrected as shown in FIG. 12C. Therefore, the imaging lens 40 has high resolution.

In the present example, the imaging lens 40 is designed with a gap of 20 μm or greater set in advance on the optical axis L4, between the image side lens surface 47b of the object side lens 47 and the object side lens surface 48a of the image side lens 48. Therefore, when the lens is being designed, it is possible to account for plus-side shifting of the field curvature in the tangential plane, which occurs due to the resin adhesive layer B4 thickening. Therefore, according to the imaging lens 40 of the present example, plus-side shifting of the field curvature in the tangential plane is suppressed as shown in FIG. 12C.

Figure 13:
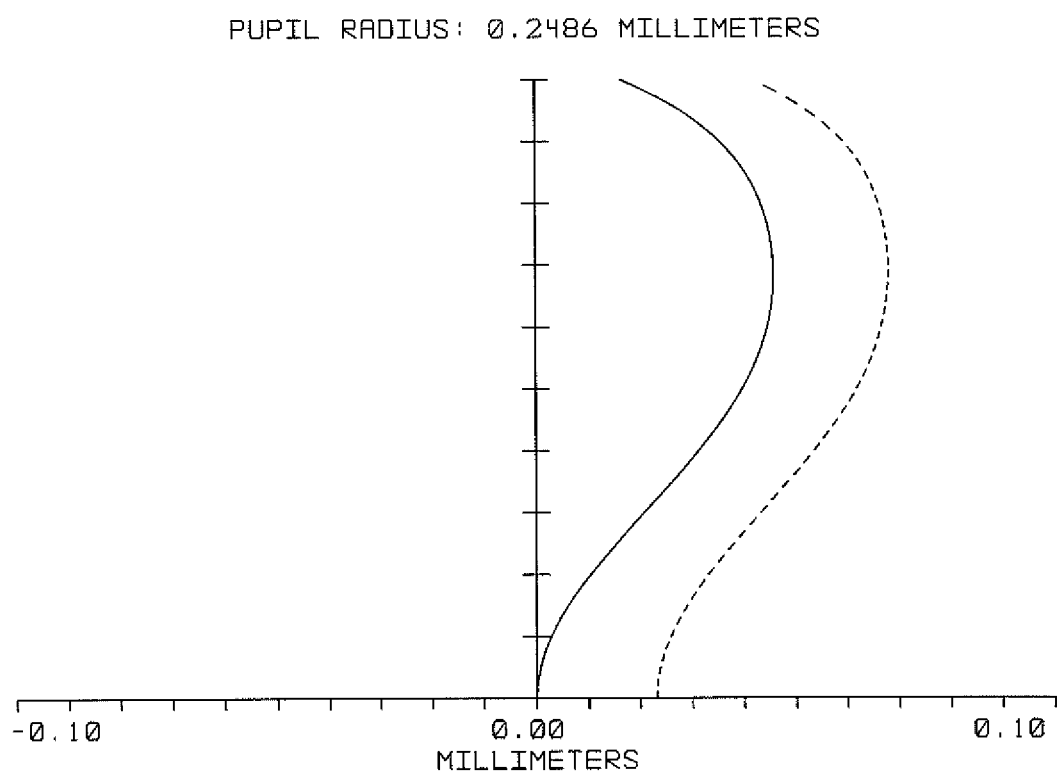
FIG. 13 is a spherical aberration graph of the imaging lens of FIG. 11.

Next, FIG. 13 is a spherical aberration graph of the imaging lens 40, wherein the solid line represents spherical aberration relative to a light ray with a wavelength of 588 nm (a visible light ray). The dashed line represents spherical aberration relative to a light ray with a wavelength of 850 nm (a near infrared ray). The horizontal axis of the spherical aberration graph represents the position where the light ray crosses the optical axis, and the vertical axis represents the height of the pupil radius. In the imaging lens 40, spherical aberration relative to a light ray with a wavelength of 850 nm is corrected as shown in FIG. 13, and there is no need for adjusting the focus between photographing under a visible light ray and photographing under a near infrared ray. In other words, in the imaging lens 40 of the present example, the occurrence of focus misalignment is suppressed between photographing using a visible light ray and photographing using a near infrared ray.

Example 5

Figure 14:
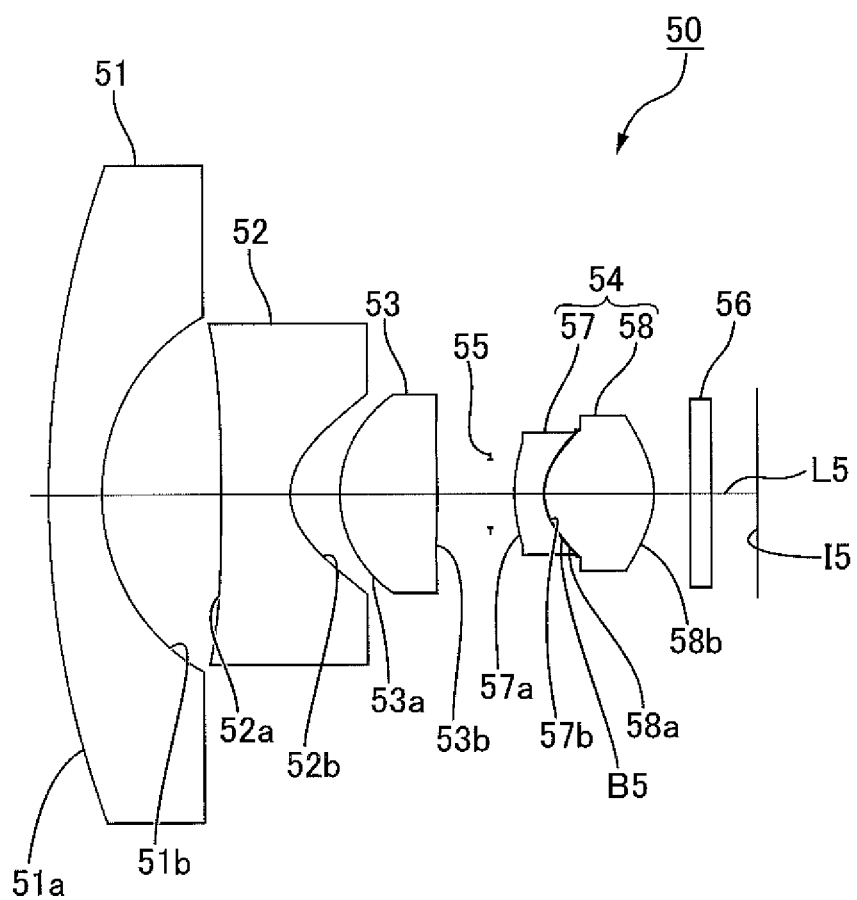
FIG. 14 is a configuration diagram of an imaging lens of Example 5 to which the present invention is applied.

FIG. 14 is a configuration diagram (light ray diagram) of an imaging lens of Example 5. An imaging lens 50 of the present example comprises, in order from an object side to an image side, a first lens 51 having negative power, a second lens 52 having negative power, a third lens 53 having positive power, and a fourth lens 54 having positive power, as shown in FIG. 14. A diaphragm 55 is disposed between the third lens 53 and the fourth lens 54, and plate glass 56 is disposed on the image side of the fourth lens 54. An image-forming surface I5 is in a separate position from the plate glass 56. The fourth lens 54 is a cemented lens comprising an object side lens 57 having negative power and an image side lens 58 having positive power. The object side lens 57 and the image side lens 58 are bonded by a resin adhesive, and a resin adhesive layer B5 is formed between the object side lens 57 and the image side lens 58. The shapes of the lenses constituting the imaging lens 50 of the present example are the same as the shapes of the lenses corresponding to the imaging lens 10 of Example 1, and descriptions thereof are therefore omitted.

When the F number of the imaging lens 50 of the present example is Fno, the half angle of view is ω, and the entire length of the lens system is L, these values are as follows.

Fno=2.0
ω=100.0°
L=19.664 mm

When f is the focal point distance of the entire lens system, f1 is the focal point distance of the first lens 51, f2 is the focal point distance of the second lens 52, f3 is the focal point distance of the third lens 53, f4 is the focal point distance of the fourth lens 54, f41 is the focal point distance of the object side lens 57, and f42 is the focal point distance of the image side lens 58, these values are as follows.

f=1.248 mm
f1=−8.890 mm
f2=−2.602 mm
f3=4.265 mm
f4=3.481 mm
f41=−4.227 mm
f42=1.479 mm

In the imaging lens 50 of the present example, when D is the thickness of the resin adhesive layer B5 on the optical axis L5, Sg1H is the amount of sag in the image side lens surface 57b of the object side lens 57 at height H in the effective diameter of the image side lens surface 57b of the object side lens 57 in a direction orthogonal to the optical axis L5, Sg2H is the amount of sag in the object side lens surface 58a of the image side lens 58 at height H, Rs is the radius of curvature of the image side lens surface 57b of the object side lens 57, R31 is the radius of curvature of the object side lens surface 53a of the third lens 53, and R32 is the radius of curvature of the image side lens surface 53b of the third lens 53, then the conditional expressions (1) to (6) given in the description of Example 1 are satisfied, and the values of the conditional expressions (1) and (3) to (6) are as follows.

$20 \text{ μm} \leq D = 20 \text{ μm}$ (1)

$Sg1H \leq Sg2H$ (2)

$D = 20 \text{ μm} \leq 100 \text{ μm}$ (3)

$0.9 \leq Rs/f = 1.120 \leq 1.3$ (4)

$-3.0 \leq (f41/f42)/f = -1.50 \leq -1.5$ (5)

$R31 = 2.828 \leq |R32| = |-13.176|$ (6)

Furthermore, in the imaging lens 50 of the present example, the Abbe number of the first lens 51, the second lens 52, and the image side lens 58 is 40 or greater, and the Abbe number of the third lens 53 and the object side lens 57 is 31 or less, whereby chromatic aberration is corrected.

Next, table 5A shows lens data of the lens surfaces of the imaging lens 50. In table 5A, the lens surfaces are specified in order counting from the object side. Lens surfaces marked with an asterisk are aspheric. Surface 7 is the diaphragm 55, and surfaces 12 and 13 are the object side glass surface and the image side glass surface of the plate glass 56. Radius of curvature and gap are in units of millimeters. The values of Nd (refractive index) and vd (Abbe number) of the tenth surface represent values of the resin adhesive layer B5.

TABLE 5A

| Surface | Radius of Curvature | Gap | Nd (ref. index) | Vd (Abbe no.) |
|---|---|---|---|---|
| 1 | 23.391 | 1.494 | 1.7725 | 49.6 |
| 2 | 5.161 | 3.317 | | |
| 3* | −89.639 | 1.888 | 1.5346 | 56.27 |
| 4* | 1.423 | 1.373 | | |
| 5* | 2.828 | 2.729 | 1.5825 | 30.18 |
| 6* | −13.176 | 1.471 | | |
| 7 | infinity | 0.651 | | |
| 8* | 3.582 | 0.820 | 1.63493 | 23.89 |
| 9* | 1.398 | 0.020 | 1.5 | 50 |
| 10* | 1.409 | 3.038 | 1.5346 | 56.27 |
| 11* | −2.097 | 1.000 | | |
| 12 | infinity | 0.600 | 1.5168 | 64.2 |
| 13 | infinity | 1.263 | | |

Next, table 5B shows aspheric coefficients for stipulating the aspheric shapes of the aspheric lens surfaces. The lens surfaces are specified in order counting from the object side in table 5B as well.

TABLE 5B

| | 3rd surface | 4th surface | 5th surface | 6th surface | 8th surface |
|---|---|---|---|---|---|
| K | 6.03211E+01 | −1.09619E+00 | −1.54839E+00 | 0.00000E+00 | 1.98881E+00 |
| A4 | −6.38352E−04 | 5.25824E−03 | 1.12674E−02 | 1.36867E−02 | −1.69038E−02 |
| A6 | 3.34872E−06 | −1.58711E−03 | −2.76736E−04 | −3.62175E−03 | 0.00000E+00 |
| A8 | 2.84477E−07 | 1.49809E−04 | −7.57961E−05 | 8.49297E−04 | 0.00000E+00 |
| A10 | −8.74143E−09 | −8.75115E−06 | 1.91559E−05 | −6.65457E−05 | 0.00000E+00 |
| A12 | 0.00000E+00 | 0.00000E+00 | −8.62848E−07 | 0.00000E+00 | 0.00000E+00 |
| A14 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 |

| | 9th surface | 10th surface | 11th surface |
|---|---|---|---|
| K | −3.94577E−01 | −1.02230E+00 | −5.74699E−01 |
| A4 | −3.53157E−03 | 5.32513E−02 | 1.90393E−02 |
| A6 | −1.92894E−02 | −2.50742E−02 | −3.09208E−03 |
| A8 | −6.20294E−03 | −2.79467E−03 | 1.24752E−03 |
| A10 | 4.93769E−03 | 2.06775E−03 | −1.89301E−04 |
| A12 | −9.98388E−04 | 0.00000E+00 | 1.45505E−05 |
| A14 | 0.00000E+00 | 0.00000E+00 | −8.37640E−07 |
| A16 | 0.00000E+00 | 0.00000E+00 | 0.00000E+00 |

(Effects)

Figure 15A:
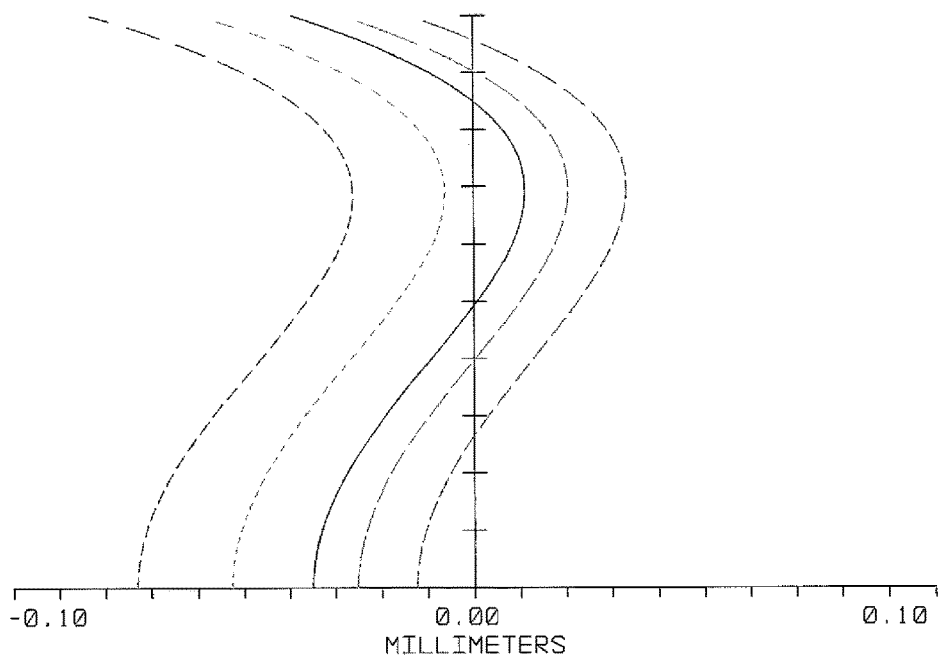
FIG. 15A is a longitudinal aberration graph of the imaging lens of FIG. 14.
Figure 15B:
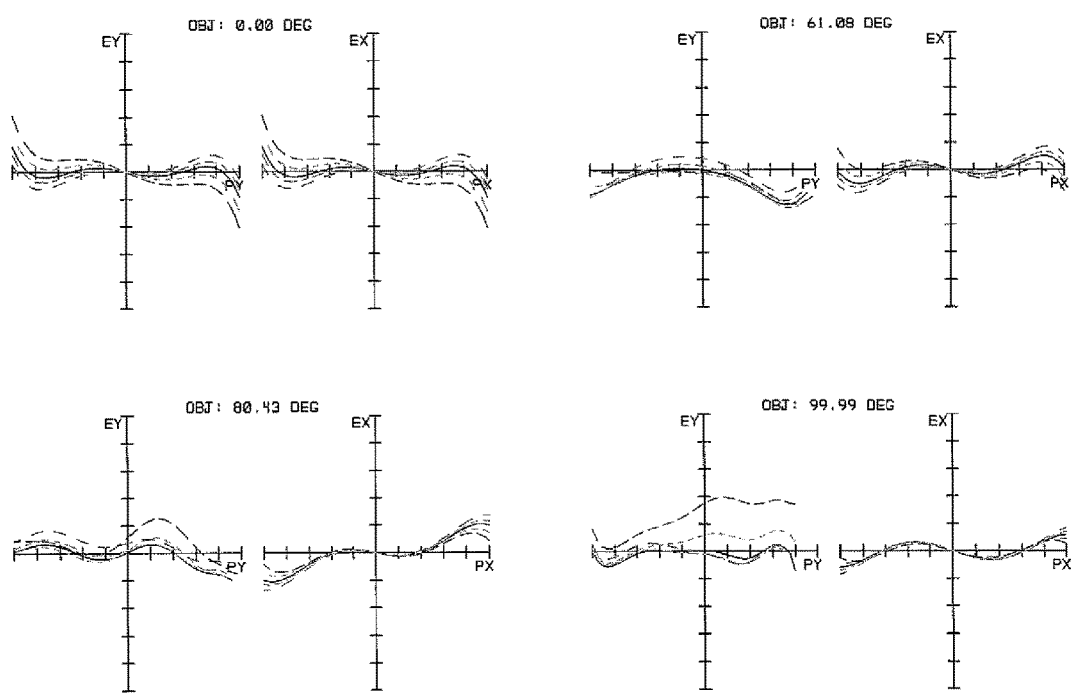
FIG. 15B is lateral aberration graphs of the imaging lens of FIG. 14.
Figure 15C:
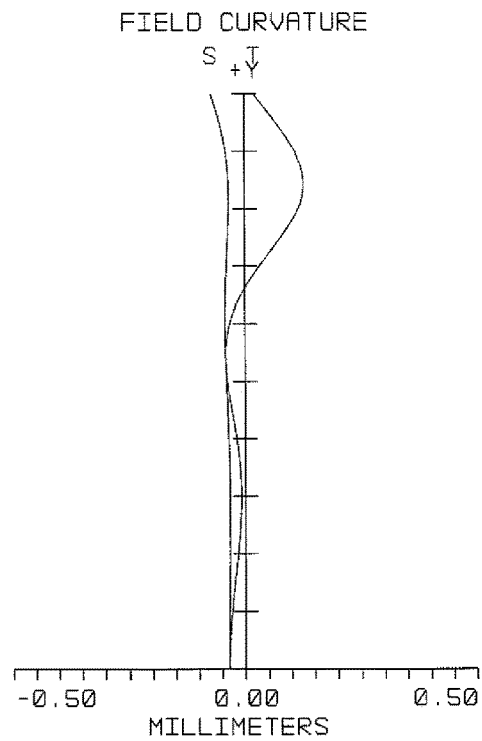
FIG. 15C is a field curvature graph of the imaging lens of FIG. 14.
Figure 15D:
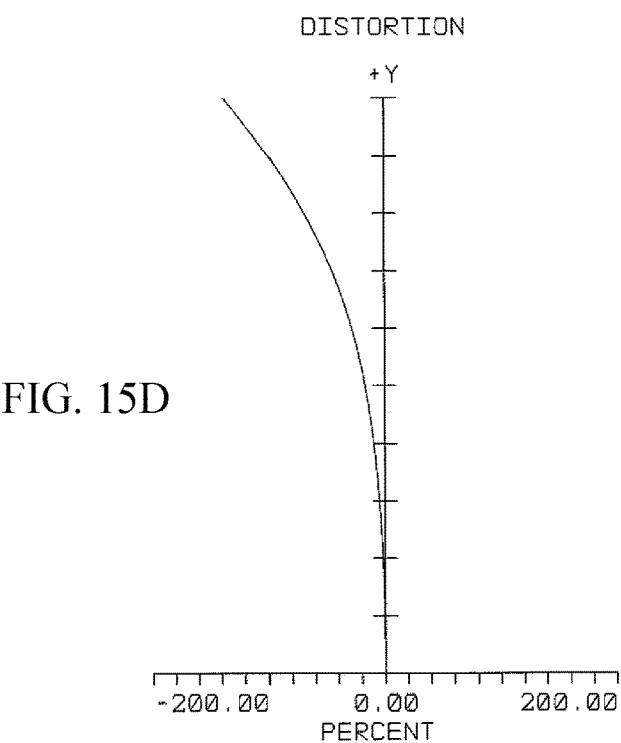
FIG. 15D is a distortion aberration graph of the imaging lens of FIG. 14.

FIGS. 15A to 15D are a longitudinal aberration graph, lateral aberration graphs, a field curvature graph, and a distortion aberration graph of the imaging lens 50. According to the imaging lens 50, axial chromatic aberration is satisfactorily corrected as shown in FIG. 15A. Color bleeding is also suppressed as shown in FIG. 15B. Both axial chromatic aberration and magnification chromatic aberration are corrected in a balanced manner in the peripheral portions as well, as shown in FIGS. 15A and 15B. Furthermore, according to the imaging lens 50 of the present example, field curvature is satisfactorily corrected as shown in FIG. 15C. Therefore, the imaging lens 50 has high resolution.

In the present example, the imaging lens 50 is designed with a gap of 20 μm or greater set in advance on the optical axis L5, between the image side lens surface 57b of the object side lens 57 and the object side lens surface 58a of the image side lens 58. Therefore, when the lens is being designed, it is possible to account for plus-side shifting of the field curvature in the tangential plane, which occurs due to the resin adhesive layer B5 thickening. Therefore, according to the imaging lens 50 of the present example, plus-side shifting of the field curvature in the tangential plane is suppressed as shown in FIG. 15C.

Figure 16:
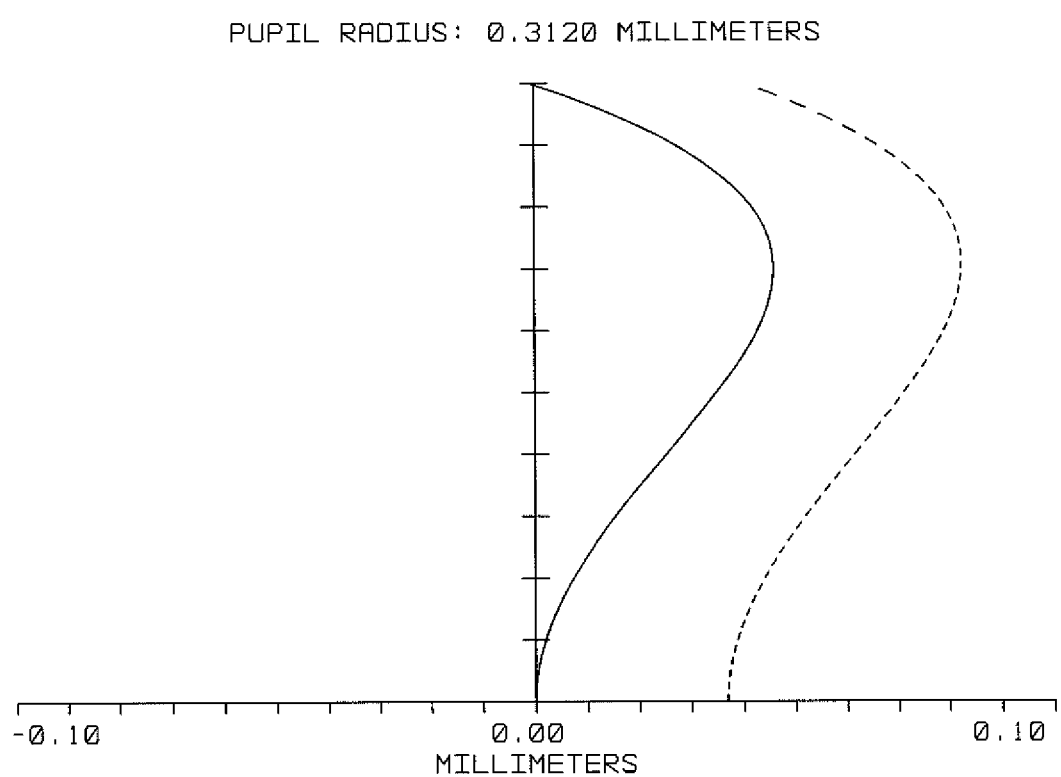
FIG. 16 is a spherical aberration graph of the imaging lens of FIG. 14.

Next, FIG. 16 is a spherical aberration graph of the imaging lens 50, wherein the solid line represents spherical aberration relative to a light ray with a wavelength of 588 nm (a visible light ray). The dashed line represents spherical aberration relative to a light ray with a wavelength of 850 nm (a near infrared ray). The horizontal axis of the spherical aberration graph represents the position where the light ray crosses the optical axis, and the vertical axis represents the height of the pupil radius. In the imaging lens 50, spherical aberration relative to a light ray with a wavelength of 850 nm is corrected as shown in FIG. 16, and there is no need for adjusting the focus between photographing under a visible light ray and photographing under a near infrared ray. In other words, in the imaging lens 50 of the present example, the occurrence of focus misalignment is suppressed between photographing using a visible light ray and photographing using a near infrared ray.

OTHER EMBODIMENTS

In the image-capturing lenses 10 to 50 described above, the image side lens surfaces (13b, 23b, 33b, 43b, 53b) of the third lenses have convex curved portions that have negative curvature and protrude progressively farther toward the image side along the optical axis, but these image side lens surfaces (13*b*, 23*b*, 33*b*, 43*b*, 53*b*) may have concave curved portions that have positive curvature and cave progressively farther toward the object side along the optical axis. It is easy in this case as well to make the image-capturing lenses 10 to 50 into wide angle lenses by satisfying conditional expression (6).

(Imaging Device)

Figure 17:
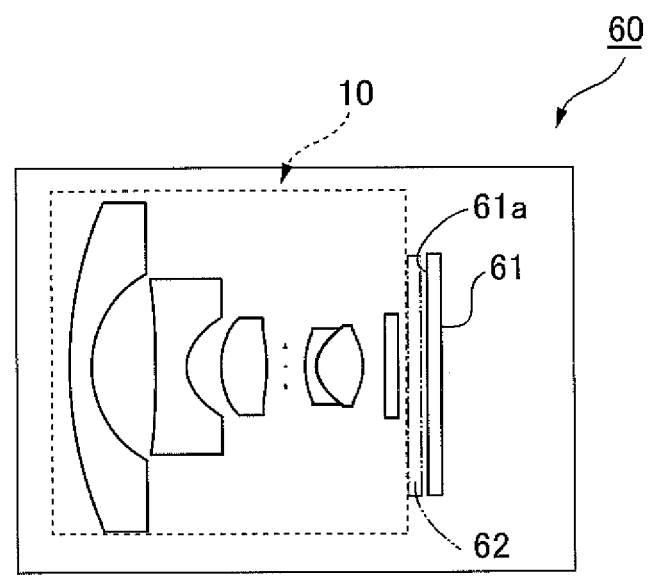
FIG. 17 is an explanatory diagram of an imaging device equipped with an imaging lens.

FIG. 17 is an explanatory diagram of an imaging device equipped with an imaging lens of the present invention. The imaging device 60 has an image pick-up device 61 in which a sensor surface 61*a* is disposed on the image-forming surface I1 (focal point position) of the imaging lens 10, as shown in FIG. 17. The image pick-up device 61 is a CCD sensor or a CMOS sensor.

According to the present example, because the imaging lens has high resolution, the imaging device 60 can be made to have high resolution by employing an image pick-up device with a high number of pixels as the image pick-up device 61. The imaging device 60 herein can be equipped with any of the imaging lenses 20 to 50 in the same manner as the imaging lens 10, in which case the same effects can be achieved.

The imaging device 60 can be made into an imaging device that utilizes a near infrared ray and a visible light ray by disposing an optical filter 62, which transmits a visible light ray and a near infrared ray of a range including a wavelength of 850 nm and guides the light rays to the imaging lens 10, between the imaging lens 10 and the image pick-up device 61, as shown by the double-dotted line in FIG. 17. Specifically, the imaging lens 10 prevents or suppresses the occurrence of focus misalignment between photographing using a visible light ray and photographing using a near infrared ray. Therefore, merely equipping the imaging device 60 with the optical filter 62 makes it possible to configure an imaging device that performs both imaging utilizing a near infrared ray including a wavelength of 850 nm, i.e. a light ray in a range of 800 nm to 1100 nm for example, and imaging utilizing a visible light ray, i.e. visible light with a wavelength of 400 nm to 700 nm. The occurrence of focus misalignment between photographing using a visible light ray and photographing using a near infrared ray is prevented or suppressed in the imaging lenses 20 to 50 as well. Therefore, merely equipping the imaging device 60 with the optical filter 62 makes it possible to configure an imaging device that performs both imaging utilizing a near infrared ray including a wavelength of 850 nm and imaging utilizing a visible light ray, similar to cases of using the imaging lens 10. The optical filter 62 may be disposed on the object sides of the imaging lenses 10 to 50.

Reference Example 1

Imaging lenses of Reference Examples 1 to 3 are described below with reference to FIGS. 18 to 23. The imaging lenses of Reference Examples 1 to 3 have configurations similar to Examples 1 to 5, but the thickness along the optical axis of the resin adhesive layer bonding the two lenses constituting the cemented lens, i.e., the gap along the optical axis between the two lenses constituting the cemented lens, is less than 20 μm.

Figure 18:
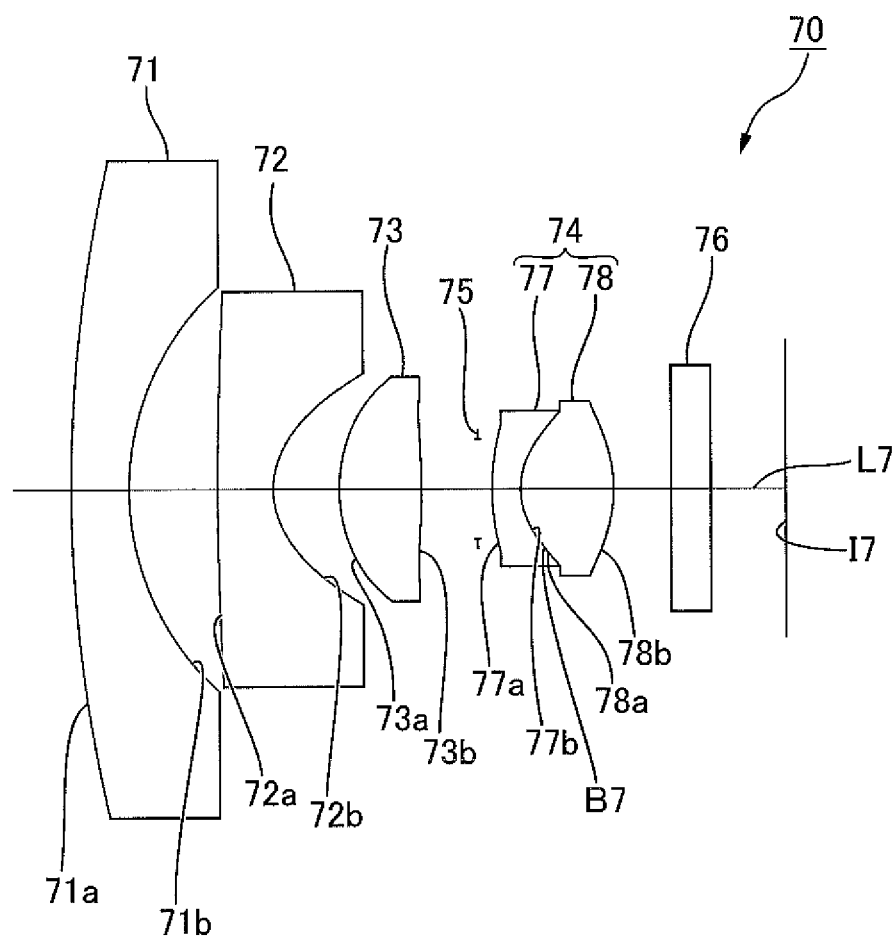
FIG. 18 is a configuration diagram of an imaging lens of Reference Example 1.

FIG. 18 is a configuration diagram (light ray diagram) of an imaging lens of Reference Example 1. An imaging lens 70 of the present example comprises, in order from an object side to an image side, a first lens 71 having negative power, a second lens 72 having negative power, a third lens 73 having positive power, and a fourth lens 74 having positive power, as shown in FIG. 18. A diaphragm 75 is disposed between the third lens 73 and the fourth lens 74, and plate glass 76 is disposed on the image side of the fourth lens 74. An image-forming surface 17 is in a separate position from the plate glass 76. The fourth lens 74 is a cemented lens comprising an object side lens 77 having negative power and an image side lens 78 having positive power. An image side lens surface 77*b* of the object side lens 77 and an object side lens surface 78*a* of the image side lens 78, which constitute cemented surfaces of the cemented lens, have the same shape. The object side lens 77 and the image side lens 78 are bonded by a resin adhesive, but there is essentially zero gap between the object side lens 77 and the image side lens 78.

When the F number of the imaging lens 70 of the present example is Fno, the half angle of view is ω, and the entire length of the lens system is L, these values are as follows.

Fno=2.0
ω=88.6°
L=12.499 mm

When f is the focal point distance of the entire lens system, f1 is the focal point distance of the first lens 71, f2 is the focal point distance of the second lens 72, f3 is the focal point distance of the third lens 73, f4 is the focal point distance of the fourth lens 74, f41 is the focal point distance of the object side lens 77, and f42 is the focal point distance of the image side lens 78, these values are as follows.

f=1.444 mm
f1=−6.918 mm
f2=−2.422 mm
f3=3.349 mm
f4=3.215 mm
f41=−3.243 mm
f42=1.752 mm

In the imaging lens 70 of the present example, when Sg1H is the amount of sag in the image side lens surface 77*b* of the object side lens 77 at height H in the effective diameter of the image side lens surface 77*b* of the object side lens 77 in a direction orthogonal to the optical axis L7, Sg2H is the amount of sag in the object side lens surface 78*a* of the image side lens 78 at height H, Rs is the radius of curvature of the image side lens surface 77*b* of the object side lens 77, R31 is the radius of curvature of the object side lens surface 73*a* of the third lens 73, and R32 is the radius of curvature of the image side lens surface 73*b* of the third lens 73, then the conditional expressions (2), (5), and (6) given in the description of Example 1 are satisfied. The values of the conditional expressions (5) and (6) are as follows.

$$Sg1H \leq Sg2H \tag{2}$$

$$-3.0 \leq (f41/f42)/f = -1.28 \leq -1.5 \tag{5}$$

$$R31 = 2.400 \leq |R32| = |-8.121| \tag{6}$$

Furthermore, in the imaging lens 70 of the present example, the Abbe number of the first lens 71, the second lens 72, and the image side lens 78 is 40 or greater, and the Abbe number of the third lens 73 and the object side lens 77 is 31 or less, whereby chromatic aberration is corrected.

In the imaging lens 70, Rs/f is equal to 0.848, which falls below the lower limit of conditional expression (4).

Next, table 6A shows lens data of the lens surfaces of the imaging lens 70. In table 6A, the lens surfaces are specified in order counting from the object side. Lens surfaces marked with an asterisk are aspheric. Surface 7 is the diaphragm 75, and surfaces 11 and 12 are the object side glass surface and the image side glass surface of the plate glass 76. Radius of curvature and gap are in units of millimeters.

TABLE 6A

| Surface | Radius of Curvature | Gap | Nd (ref. index) | Vd (Abbe no.) |
|---|---|---|---|---|
| 1 | 22.729 | 1.000 | 1.77250 | 49.6 |
| 2 | 4.244 | 1.568 | | |
| 3* | 39.094 | 0.982 | 1.53461 | 56.0 |
| 4* | 1.242 | 1.159 | | |
| 5* | 2.400 | 1.439 | 1.58246 | 30.1 |
| 6* | −8.121 | 0.982 | | |
| 7 | infinity | 0.253 | | 0.253 |
| 8* | 3.497 | 0.500 | 1.63494 | 24.0 |
| 9* | 1.224 | 1.613 | 1.53461 | 56.0 |
| 10* | −2.158 | 1.000 | | |
| 11 | infinity | 0.700 | 1.51680 | 64.2 |
| 12 | infinity | 1.303 | | |

Next, table 6B shows aspheric coefficients for stipulating the aspheric shapes of the aspheric lens surfaces. The lens surfaces are specified in order counting from the object side in table 6B as well.

TABLE 6B

| | 3rd surface | 4th surface | 5th surface | 6th surface | 8th surface | 9th surface | 10th surface |
|---|---|---|---|---|---|---|---|
| K | 0.00000E+00 | −1.10386E+00 | −2.85133E+00 | 0.00000E+00 | 4.41585E+00 | −4.03391E−01 | −4.40846E−01 |
| A4 | −7.22684E−04 | 9.69822E−03 | 1.85742E−02 | 2.04844E−02 | −1.30111E−02 | 3.93057E−02 | 1.42869E−02 |
| A6 | 1.99874E−05 | 2.41562E−03 | 4.74678E−03 | 1.76868E−04 | −9.10184E−03 | −6.30264E−02 | 2.13805E−03 |
| A8 | 3.95429E−06 | 5.68796E−04 | −4.47446E−04 | −4.19487E−04 | 0.00000E+00 | 6.71597E−04 | 1.85498E−03 |
| A10 | −1.77245E−07 | −2.05578E−04 | −2.82868E−05 | 1.24097E−04 | 0.00000E+00 | 7.59331E−03 | −1.10425E−03 |
| A12 | 0.00000E+00 | 0.00000E+00 | 9.43715E−06 | 0.00000E+00 | 0.00000E+00 | −3.65218E−03 | −1.28829E−04 |
| A14 | 0.00000E+00 | 0.00000E+00 | 0.00000E+00 | 0.00000E+00 | 0.00000E+00 | 0.00000E+00 | 2.71356E−04 |
| A16 | 0.00000E+00 | 0.00000E+00 | 0.00000E+00 | 0.00000E+00 | 0.00000E+00 | 0.00000E+00 | 0.00000E+00 |

Figure 19A:
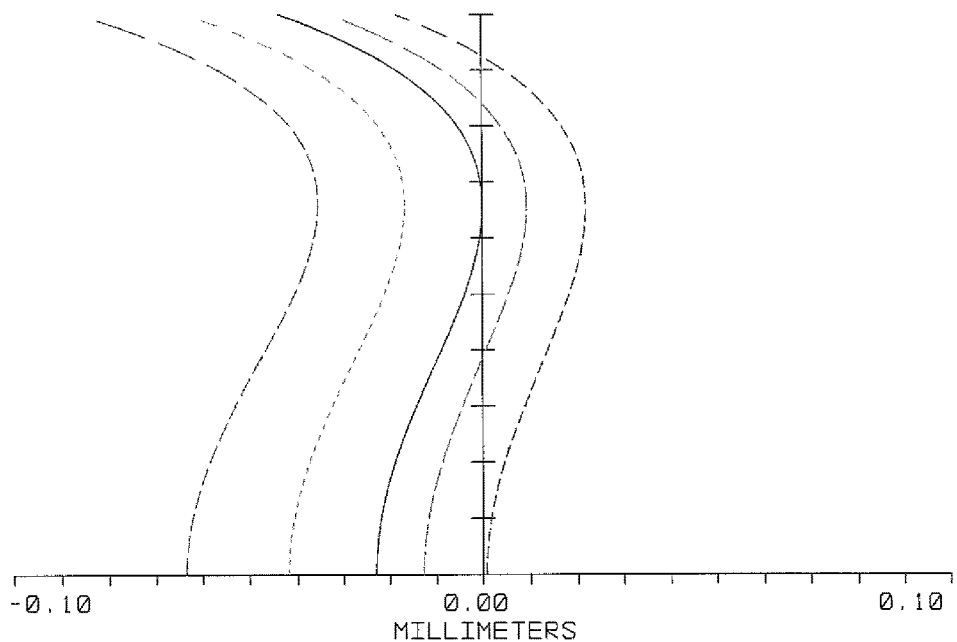
FIG. 19A is a longitudinal aberration graph of the imaging lens of FIG. 18.
Figure 19B:
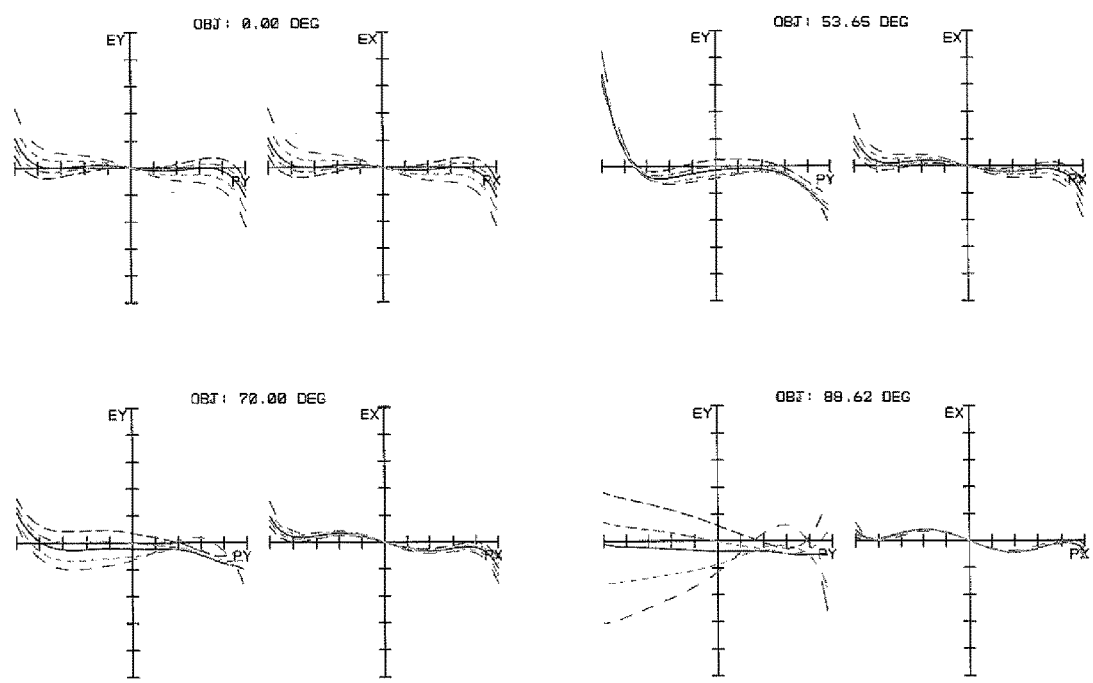
FIG. 19B is lateral aberration graphs of the imaging lens of FIG. 18.
Figure 19C:
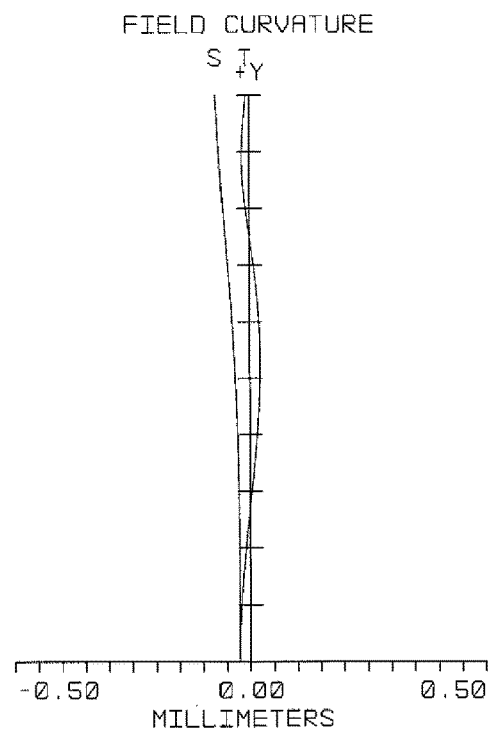
FIG. 19C is a field curvature graph of the imaging lens of FIG. 18.
Figure 19D:
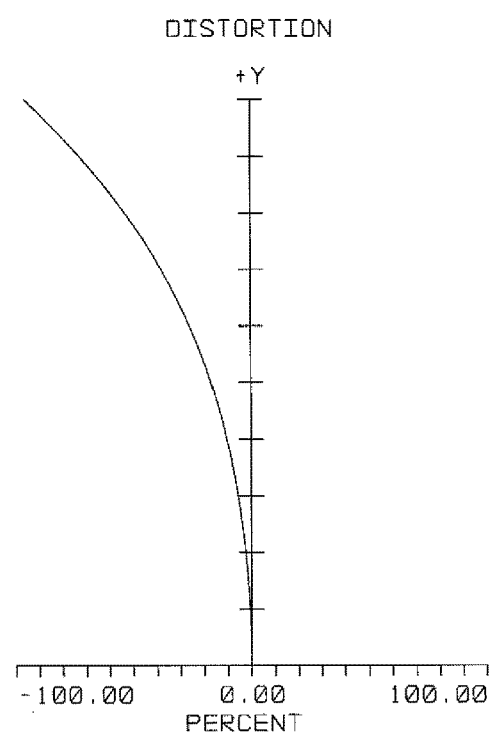
FIG. 19D is a distortion aberration graph of the imaging lens of FIG. 18.

FIGS. 19A to 19D are a longitudinal aberration graph, lateral aberration graphs, a field curvature graph, and a distortion aberration graph of the imaging lens 70. According to the imaging lens 70 of the present example, axial chromatic aberration is satisfactorily corrected as shown in FIG. 19A. Color bleeding is also suppressed as shown in FIG. 19B. Both axial chromatic aberration and magnification chromatic aberration are corrected in a balanced manner in the peripheral portions as well, as shown in FIGS. 19A and 19B. Furthermore, according to the imaging lens 70 of the present example, field curvature is satisfactorily corrected as shown in FIG. 19C.

Reference Example 2

Figure 20:
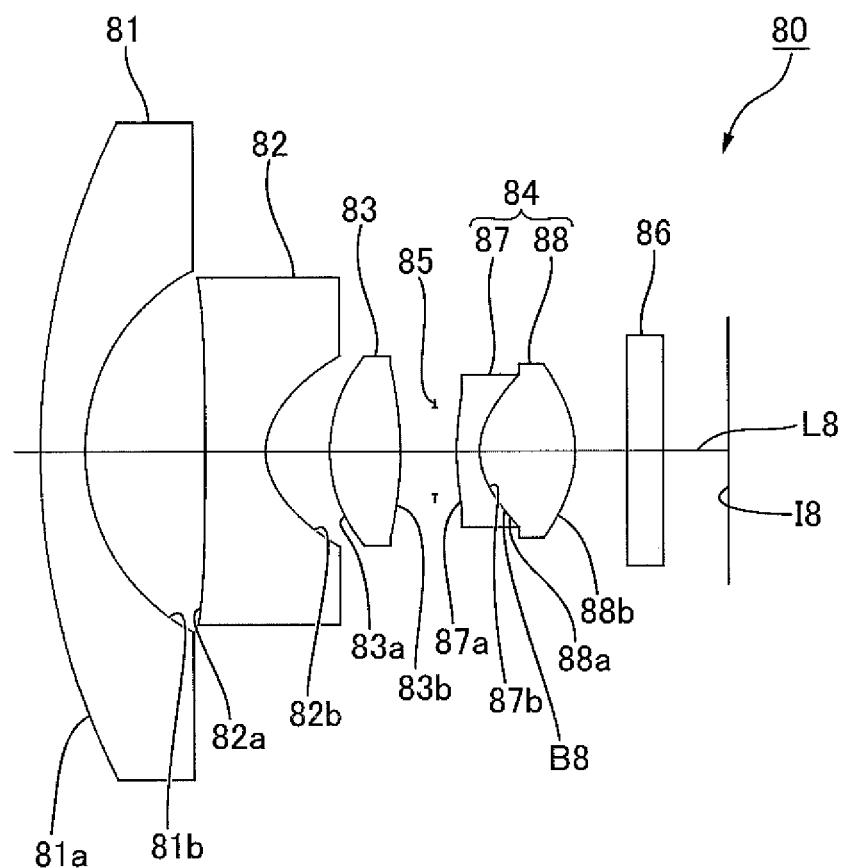
FIG. 20 is a configuration diagram of an imaging lens of Reference Example 2.

FIG. 20 is a configuration diagram (light ray diagram) of an imaging lens of Reference Example 2. An imaging lens 80 of the present example comprises, in order from an object side to an image side, a first lens 81 having negative power, a second lens 82 having negative power, a third lens 83 having positive power, and a fourth lens 84 having positive power, as shown in FIG. 20. A diaphragm 85 is disposed between the third lens 83 and the fourth lens 84, and plate glass 86 is disposed on the image side of the fourth lens 84. An image-forming surface I8 is in a separate position from the plate glass 86. The fourth lens 84 is a cemented lens comprising an object side lens 87 having negative power and an image side lens 88 having positive power. An image side lens surface 87b of the object side lens 87 and an object side lens surface 88a of the image side lens 88, which constitute cemented surfaces of the cemented lens, have the same shape. The object side lens 87 and the image side lens 88 are bonded by a resin adhesive, but there is essentially zero gap between the object side lens 87 and the image side lens 88.

When the F number of the imaging lens 80 of the present example is Fno, the half angle of view is ω, and the entire length of the lens system is L, these values are as follows.
Fno=2.0
ω=100.8°
L=13.301 mm When f is the focal point distance of the entire lens system, f1 is the focal point distance of the first lens 81, f2 is the focal point distance of the second lens 82, f3 is the focal point distance of the third lens 83, f4 is the focal point distance of the fourth lens 84, f41 is the focal point distance of the object side lens 87, and f42 is the focal point distance of the image side lens 88, these values are as follows.
f=1.187 mm
f1=−6.813 mm
f2=−2.080 mm
f3=3.061 mm
f4=3.238 mm
f41=−2.699 mm
f42=1.743 mm In the imaging lens 80 of the present example, when Sg1H is the amount of sag in the image side lens surface 87b of the object side lens 87 at height H in the effective diameter of the image side lens surface 87b of the object side lens 87 in a direction orthogonal to the optical axis L8, Sg2H is the amount of sag in the object side lens surface 88a of the image side lens 88 at height H, Rs is the radius of curvature of the image side lens surface 87b of the object side lens 87, R31 is the radius of curvature of the object side lens surface 83a of the third lens 83, and R32 is the radius of curvature of the image side lens surface 83b of the third lens 83, then the conditional expressions (2), (4), and (6) given in the description of Example 1 are satisfied. The values of the conditional expressions (4) and (6) are as follows.

$Sg1H \leq Sg2H$ (2)

$0.9 \leq Rs/f = 1.016 \leq 1.3$ (4)

$R31 = 2.437 \leq |R32| = |-5.274|$ (6)

Furthermore, in the imaging lens 80 of the present example, the Abbe number of the first lens 81, the second lens 82, and the image side lens 88 is 40 or greater, and the Abbe number of the third lens 83 and the object side lens 87 is 31 or less, whereby chromatic aberration is corrected.

In the imaging lens 80, (f41/f42)/f is equal to −1.30, which exceeds the upper limit of conditional expression (5).

Next, table 7A shows lens data of the lens surfaces of the imaging lens 80. In table 7A, the lens surfaces are specified in order counting from the object side. Lens surfaces marked with an asterisk are aspheric. Surface 7 is the diaphragm 85, and surfaces 11 and 12 are the object side glass surface and the image side glass surface of the plate glass 86. Radius of curvature and gap are in units of millimeters.

TABLE 7A

| Surface | Radius of Curvature | Gap | Nd (ref. index) | Vd (Abbe no.) |
|---|---|---|---|---|
| 1 | 12.581 | 0.875 | 1.77250 | 49.6 |
| 2 | 3.598 | 2.342 | | |
| 3* | −118.176 | 1.152 | 1.53461 | 56.0 |
| 4* | 1.126 | 1.259 | | |
| 5* | 2.437 | 1.368 | 1.58246 | 30.1 |
| 6* | −5.274 | 0.673 | | |
| 7 | infinity | 0.420 | | |
| 8* | 4.645 | 0.438 | 1.63494 | 24.0 |
| 9* | 1.206 | 1.858 | 1.53461 | 56.0 |
| 10* | −1.897 | 1.000 | | |
| 11 | infinity | 0.700 | 1.51680 | 64.2 |
| 12 | infinity | 1.219 | | |

Next, table 7B shows aspheric coefficients for stipulating the aspheric shapes of the aspheric lens surfaces. The lens surfaces are specified in order counting from the object side in table 7B as well.

TABLE 7B

| | 3rd surface | 4th surface | 5th surface | 6th surface | 8th surface | 9th surface | 10th surface |
|---|---|---|---|---|---|---|---|
| K | 0.00000E+00 | −1.13533E+00 | −4.01872E+00 | 0.00000E+00 | 5.79883E+00 | −4.07305E−01 | −1.94772E−01 |
| A4 | −8.54655E−04 | 1.39815E−02 | 2.10044E−02 | 1.45092E−02 | −2.47392E−02 | 1.81021E−02 | 2.02986E−02 |
| A6 | 3.48800E−06 | 3.24264E−03 | 4.34476E−03 | −3.69268E−03 | −3.33467E−03 | −7.87518E−02 | −1.42584E−03 |
| A8 | −1.66300E−06 | 2.03665E−03 | −1.10311E−03 | 3.93990E−04 | 0.00000E+00 | 9.40828E−03 | 4.08231E−03 |
| A10 | −1.82690E−08 | −6.85755E−04 | −1.91464E−05 | −3.15360E−05 | 0.00000E+00 | 1.13729E−02 | −2.37074E−03 |
| A12 | 0.00000E+00 | 0.00000E+00 | −3.53083E−06 | 0.00000E+00 | 0.00000E+00 | −4.88917E−03 | 7.85272E−04 |
| A14 | 0.00000E+00 | 0.00000E+00 | 0.00000E+00 | 0.00000E+00 | 0.00000E+00 | 0.00000E+00 | −1.01850E−04 |
| A16 | 0.00000E+00 | 0.00000E+00 | 0.00000E+00 | 0.00000E+00 | 0.00000E+00 | 0.00000E+00 | 0.00000E+00 |

Figure 21A:
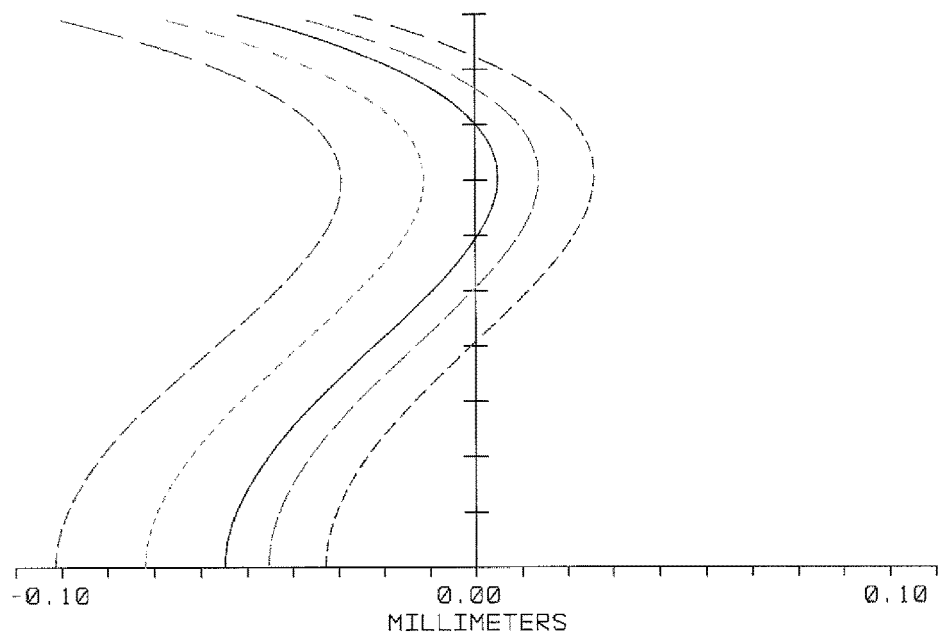
FIG. 21A is a longitudinal aberration graph of the imaging lens of FIG. 20.
Figure 21B:
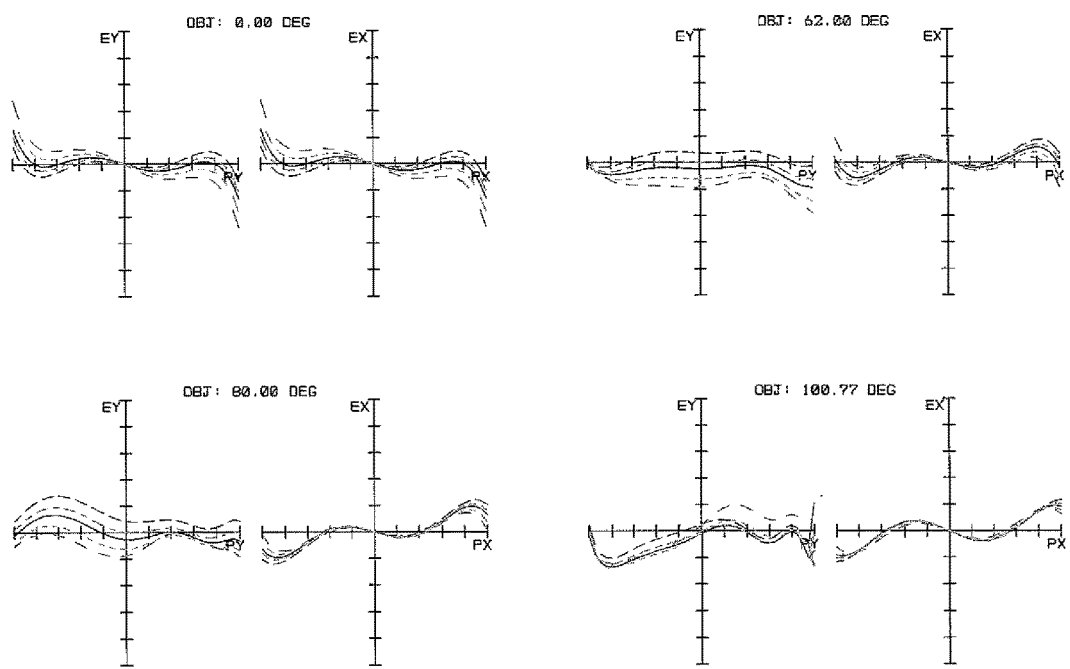
FIG. 21B is lateral aberration graphs of the imaging lens of FIG. 20.
Figure 21C:
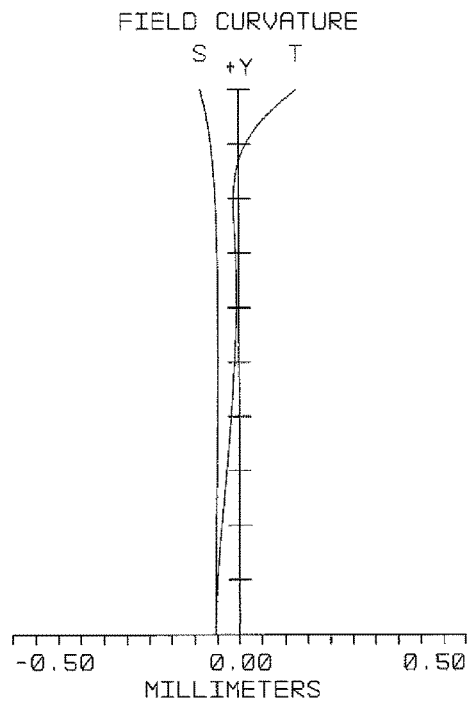
FIG. 21C is a field curvature graph of the imaging lens of FIG. 20.
Figure 21D:
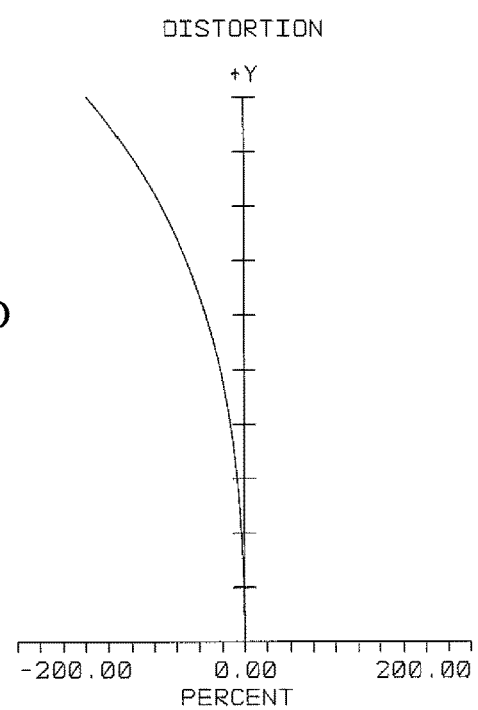
FIG. 21D is a distortion aberration graph of the imaging lens of FIG. 20.

FIGS. 21A to 21D are a longitudinal aberration graph, lateral aberration graphs, a field curvature graph, and a distortion aberration graph of the imaging lens 80. According to the imaging lens 80 of the present example, axial chromatic aberration is satisfactorily corrected as shown in FIG. 21A. Color bleeding is also suppressed as shown in FIG. 21B. Both axial chromatic aberration and magnification chromatic aberration are corrected in a balanced manner in the peripheral portions as well, as shown in FIGS. 21A and 21B. Furthermore, according to the imaging lens 80 of the present example, field curvature is satisfactorily corrected as shown in FIG. 21C.

Reference Example 3

Figure 22:
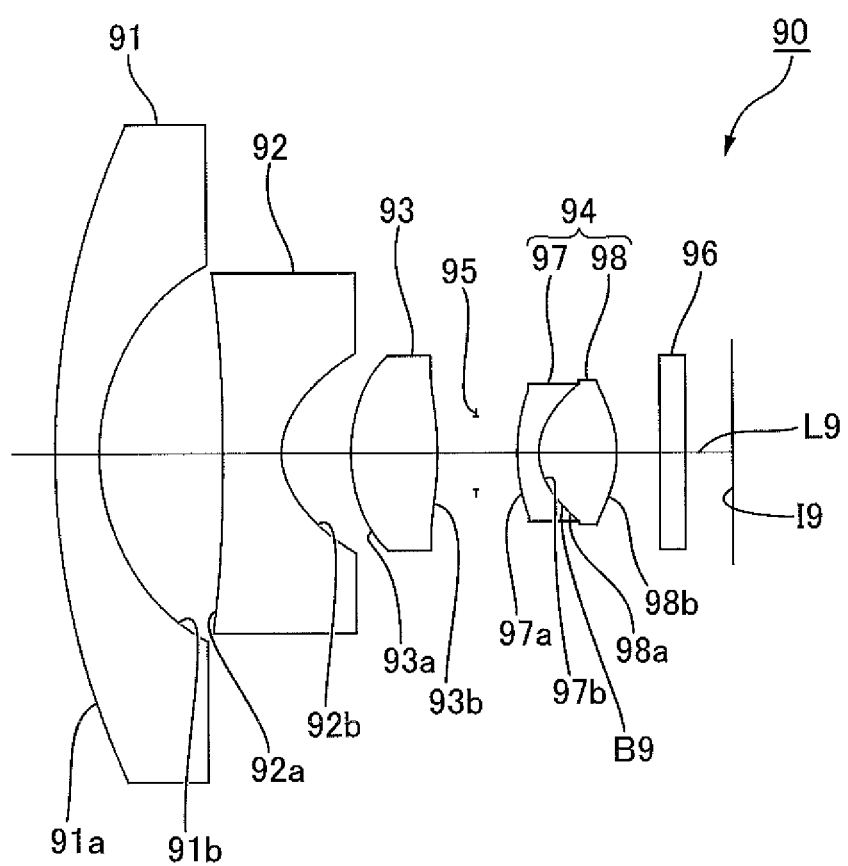
FIG. 22 is a configuration diagram of an imaging lens of Reference Example 3.

FIG. 22 is a configuration diagram (light ray diagram) of an imaging lens of Reference Example 3. An imaging lens 90 of the present example comprises, in order from an object side to an image side, a first lens 91 having negative power, a second lens 92 having negative power, a third lens 93 having positive power, and a fourth lens 94 having positive power, as shown in FIG. 22. A diaphragm 95 is disposed between the third lens 93 and the fourth lens 94, and plate glass 96 is disposed on the image side of the fourth lens 94. An image-forming surface 19 is in a separate position from the plate glass 96. The fourth lens 94 is a cemented lens comprising an object side lens 97 having negative power and an image side lens 98 having positive power. An image side lens surface 97b of the object side lens 97 and an object side lens surface 98a of the image side lens 98, which constitute cemented surfaces of the cemented lens, have the same shape. The object side lens 97 and the image side lens 98 are bonded by a resin adhesive, but there is essentially zero gap between the object side lens 97 and the image side lens 98.

When the F number of the imaging lens 90 of the present example is Fno, the half angle of view is ω, and the entire length of the lens system is L, these values are as follows.
Fno=2.0
ω=97.6°
L=15.633 mm When f is the focal point distance of the entire lens system, f1 is the focal point distance of the first lens 91, f2 is the focal point distance of the second lens 92, f3 is the focal point distance of the third lens 93, f4 is the focal point distance of the fourth lens 94, f41 is the focal point distance of the object side lens 97, and f42 is the focal point distance of the image side lens 98, these values are as follows.
f=1.149 mm
f1=−8.499 mm
f2=−2.585 mm
f3=3.991 mm
f4=3.208 mm
f41=−3.508 mm
f42=1.833 mm In the imaging lens 90 of the present example, when Sg1H is the amount of sag in the image side lens surface 97b of the object side lens 97 at height H in the effective diameter of the image side lens surface 97b of the object side lens 97 in a direction orthogonal to the optical axis L9, Sg2H is the amount of sag in the object side lens surface 98a of the image side lens 98 at height H, Rs is the radius of curvature of the image side lens surface 97b of the object side lens 97, R31 is the radius of curvature of the object side lens surface 93a of the third lens 93, and R32 is the radius of curvature of the image side lens surface 93b of the third lens 93, then the conditional expressions (2) and (4) to (6) given in the description of Example 1 are satisfied. The values of the conditional expressions (4) to (6) are as follows.

$$Sg1H \le Sg2H \quad (2)$$

$$0.9 \le Rs/f = 1.110 \le 1.3 \quad (4)$$

$$-3.0 \le (f41/f42)/f = -1.67 \le -1.5 \quad (5)$$

$$R31 = 3.342 \le |R32| = |-5.935| \quad (6)$$

Furthermore, in the imaging lens 90 of the present example, the Abbe number of the first lens 91, the second lens 92, and the image side lens 98 is 40 or greater, and the Abbe number of the third lens 93 and the object side lens 97 is 31 or less, whereby chromatic aberration is corrected.

Next, table 8A shows lens data of the lens surfaces of the imaging lens 90. In table 8A, the lens surfaces are specified in order counting from the object side. Lens surfaces marked with an asterisk are aspheric. Surface 7 is the diaphragm 95, and surfaces 11 and 12 are the object side glass surface and the image side glass surface of the plate glass 96. Radius of curvature and gap are in units of millimeters.

TABLE 8A

| Surface | Radius of Curvature | Gap | Nd (ref. index) | Vd (Abbe no.) |
|---|---|---|---|---|
| 1 | 16.292 | 1.000 | 1.77250 | 49.6 |
| 2 | 4.554 | 2.863 | | |
| 3* | −52.037 | 1.359 | 1.53461 | 56.0 |
| 4* | 1.432 | 1.602 | | |
| 5* | 3.342 | 2.021 | 1.58246 | 30.1 |
| 6* | −5.935 | 0.889 | | |
| 7 | infinity | 0.952 | | |
| 8* | 3.437 | 0.500 | 1.63494 | 24.0 |
| 9* | 1.275 | 1.790 | 1.53461 | 56.0 |
| 10* | −2.164 | 1.000 | | |
| 11 | infinity | 0.600 | 1.51680 | 64.2 |
| 12 | infinity | 1.057 | | |

Next, table 8B shows aspheric coefficients for stipulating the aspheric shapes of the aspheric lens surfaces. The lens surfaces are specified in order counting from the object side in table 8B as well.

TABLE 8B

| | 3rd surface | 4th surface | 5th surface | 6th surface | 8th surface | 9th surface | 10th surface |
|---|---|---|---|---|---|---|---|
| K | −3.33493E+01 | −1.29400E+00 | −4.40184E+00 | 0.00000E+00 | 1.49298E+00 | −5.08447E−01 | −4.39594E−01 |
| A4 | −6.99972E−04 | 9.34144E−03 | 1.33728E−02 | 1.33056E−02 | −1.36471E−02 | 6.31739E−03 | 2.28238E−02 |
| A6 | 1.13834E−05 | 6.88100E−04 | 5.92956E−04 | −2.58752E−03 | 1.31356E−03 | −1.87118E−02 | −2.73430E−03 |
| A8 | 8.10438E−07 | 1.84424E−04 | −8.48007E−05 | 9.16595E−04 | 0.00000E+00 | −5.29138E−03 | 1.36823E−03 |
| A10 | −2.53050E−08 | −3.12281E−05 | 1.84343E−05 | −7.96107E−05 | 0.00000E+00 | 4.63914E−03 | −1.80092E−04 |
| A12 | 0.00000E+00 | 0.00000E+00 | 1.83298E−06 | 0.00000E+00 | 0.00000E+00 | −1.03406E−03 | 4.37716E−05 |
| A14 | 0.00000E+00 | 0.00000E+00 | 0.00000E+00 | 0.00000E+00 | 0.00000E+00 | 0.00000E+00 | 1.66015E−05 |
| A16 | 0.00000E+00 | 0.00000E+00 | 0.00000E+00 | 0.00000E+00 | 0.00000E+00 | 0.00000E+00 | 0.00000E+00 |

Figure 23A:
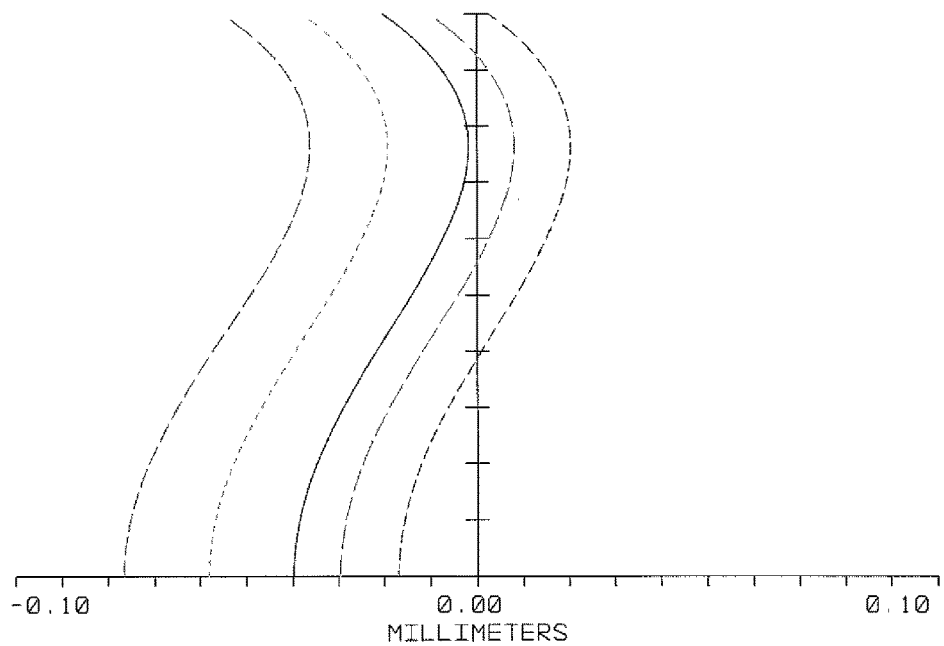
FIG. 23A is a longitudinal aberration graph of the imaging lens of FIG. 22.
Figure 23B:
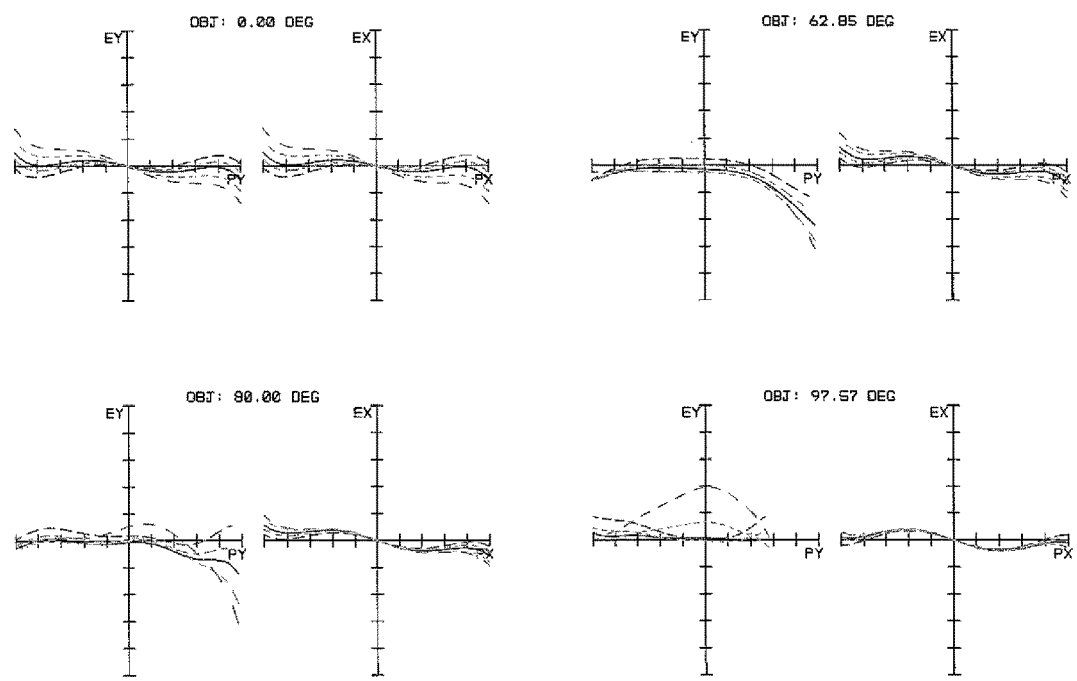
FIG. 23B is lateral aberration graphs of the imaging lens of FIG. 22.
Figure 23C:
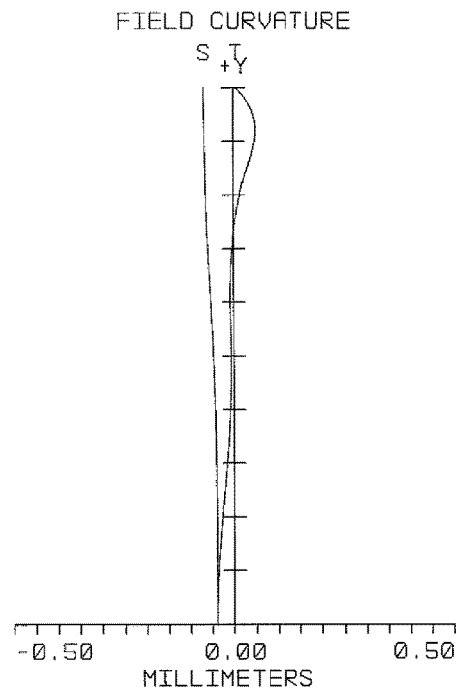
FIG. 23C is a field curvature graph of the imaging lens of FIG. 22.
Figure 23D:
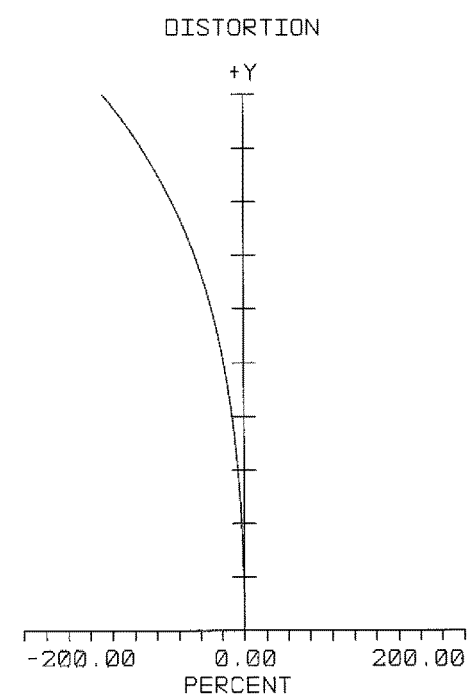
FIG. 23D is a distortion aberration graph of the imaging lens of FIG. 22.

FIGS. 23A to 23D are a longitudinal aberration graph, lateral aberration graphs, a field curvature graph, and a distortion aberration graph of the imaging lens 90. According to the imaging lens 90 of the present example, axial chromatic aberration is satisfactorily corrected as shown in FIG. 23A. Color bleeding is also suppressed as shown in FIG. 23B. Both axial chromatic aberration and magnification chromatic aberration are corrected in a balanced manner in the peripheral portions as well, as shown in FIGS. 23A and 23B. Furthermore, according to the imaging lens 90 of the present example, field curvature is satisfactorily corrected as shown in FIG. 23C.

| [Symbols] | |
|---|---|
| 10, 20, 30, 40, 50 | Imaging lenses |
| 11, 21, 31, 41, 51 | First lenses |
| 12, 22, 32, 42, 52 | Second lenses |
| 13, 23, 33, 43, 53 | Third lenses |
| 14, 24, 34, 44, 54 | Fourth lenses (cemented lenses) |
| 17, 27, 37, 47, 57 | Object side lenses |
| 18, 28, 38, 48, 58 | Image side lenses |
| 15, 25, 35, 45, 55 | Diaphragms |
| B1, B2, B3, B4, B5 | Resin adhesive layers |
| L1, L2, L3, L4, L5 | Optical axes |
| I1, I2, I3, I4, I5 | Image-forming surfaces |
| 60 | Imaging device |
| 61 | Image pick-up device |
| 61a | Sensor surface |
| 62 | Optical filter |

The invention claimed is:

1. An image lens comprising:
a first lens having negative power, a second lens having negative power, a third lens having positive power, an aperture, and a fourth lens having positive power arranged in order from an object side toward an image side,
wherein the third lens has a convex shape in the object side lens surface, and the fourth lens is a cemented lens composed of an object side lens having negative power and an image side lens having positive power,
the object side lens has a convex shape in the object side lens surface,
cemented surfaces of the object side lens and the image side lens have convex shape protruding toward the object side, and
the following conditional expression (2) is satisfied:

$$R32 \le |R32| \quad (2)$$

where R31 represents a radius of curvature of the object side lens surface of the third lens, and R32 represents a radius of curvature of an image side lens surface of the third lens.

2. An imaging lens according to claim 1, wherein the following conditional expression (1) is satisfied:

$$0.9 \le Rs/f \quad (1)$$

where Rs represents a radius of curvature of the image side lens surface of the object side lens, and f represents a focal point distance of an entire lens system.

3. An imaging lens according to claim 1, wherein the following conditional expression (3) is satisfied:

$$v3 \le 31 \quad (3)$$

where v3 represents an Abbe number of the third lens.

* * * * *